(12) United States Patent
Chen et al.

(10) Patent No.: US 8,930,784 B1
(45) Date of Patent: Jan. 6, 2015

(54) APPARATUS AND METHOD FOR FINDING LIKELY COMBINATIONS OF TRANSMITTED SYMBOLS

(75) Inventors: Yanni Chen, Sunnyvale, CA (US); Rajesh Juluri, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 248 days.

(21) Appl. No.: 13/586,540

(22) Filed: Aug. 15, 2012

Related U.S. Application Data

(62) Division of application No. 11/934,351, filed on Nov. 2, 2007, now Pat. No. 8,266,510.

(60) Provisional application No. 60/864,653, filed on Nov. 7, 2006.

(51) Int. Cl.
*H03M 13/00* (2006.01)
*H04L 25/03* (2006.01)
*H04L 1/00* (2006.01)

(52) U.S. Cl.
CPC .......... *H04L 25/03891* (2013.01); *H04L 1/004* (2013.01); *H04L 25/03203* (2013.01)
USPC .......................... 714/746; 714/780; 375/341

(58) Field of Classification Search
CPC .................. H04L 25/03891; H04L 25/03203; H04L 1/004; H04L 1/0026; H04L 25/03184
USPC ........... 714/746, 793–796, 780; 375/341, 360
See application file for complete search history.

(56) References Cited

U.S. PATENT DOCUMENTS

| | | | |
|---|---|---|---|
| 7,197,084 B2 | 3/2007 | Ketchum et al. | |
| 7,212,579 B2 | 5/2007 | Claussen et al. | |
| 7,271,747 B2 | 9/2007 | Baraniuk et al. | |
| 7,511,643 B2 | 3/2009 | Baraniuk et al. | |
| 7,564,814 B2 | 7/2009 | Abraham et al. | |
| 7,668,252 B2 | 2/2010 | Sandell et al. | |
| 7,986,752 B2 | 7/2011 | Nikopour-Deilami et al. | |
| 7,991,066 B2 | 8/2011 | Lee et al. | |
| 8,027,402 B2 | 9/2011 | Lee et al. | |
| 8,266,510 B1 | 9/2012 | Chen et al. | |
| 8,743,676 B2 * | 6/2014 | Mukherjee | 370/208 |
| 2005/0135498 A1 * | 6/2005 | Yee | 375/267 |
| 2007/0230382 A1 | 10/2007 | Ding et al. | |
| 2009/0060079 A1 * | 3/2009 | Choi et al. | 375/265 |
| 2009/0067531 A1 * | 3/2009 | Lee et al. | 375/267 |
| 2013/0329645 A1 * | 12/2013 | Golitschek Edler von Elbwart | 370/328 |

OTHER PUBLICATIONS

Yuanbin Guo; McCain, D., "Reduced QRD-M detector in MIMO-OFDM systems with partial and embedded sorting," Global Telecommunications Conference, 2005. GLOBECOM '05. IEEE, vol. 1, no., pp. 6 pp.,, Nov. 28-Dec. 2, 2005.*

(Continued)

*Primary Examiner* — Cynthia Britt

(57) ABSTRACT

A high throughput and scalable MIMO detector can use a K-Best detection algorithm to find K combinations of transmit symbols that are likely to be the symbols that were actually transmitted. The K-best MIMO detector can include a plurality of stages, where each stage may correspond to a transmit antenna, and each stage can find K best symbol combinations based on information from a previous stage. To find the new K best symbol combinations, at each stage, a plurality of metrics for potential combinations are computed and sorted by magnitude. The MIMO detector preferably uses a high throughput, merge sorting algorithm to sort the metrics.

19 Claims, 23 Drawing Sheets

(56) References Cited

OTHER PUBLICATIONS

Voulgaris, P.G., et al., "A Perfect Reconstruction Paradigm for Digital Communication," Proceedings of the 42$^{nd}$ IEEE Conference on Decision and Control, pp. 4196-4201, Dec. 9-12, 2003.

Rey, F. et al., "A Robust Transmitter Design Based on Cutoff Rate for MIMO Multicarrier Systems With Imperfect Channel Estimates", 2004 IEEE Sensor Array and Multichannel Signal Processing Workshop Proceedings, pp. 528-532, Jul. 2004.

Rey, F. et al., "Coded BER minimization for MIMO Multicarrier Systems with Imperfect Channel Estimates", 2004 IEEE 5$^{th}$ Workshop on Signal Processing Advances in Wireless Communications, pp. 238-242, Jul. 2004.

Wong, K. et al., "List Slab-Sphere Decoding: Efficient High-Performance Decoding for Asymmetric MIMO Antenna Systems", Vehicular Technology Conference, VTC 2005-Spring, 2005 IEEE 61$^{st}$, vol. 1, pp. 697-701, Jun. 2005.

* cited by examiner

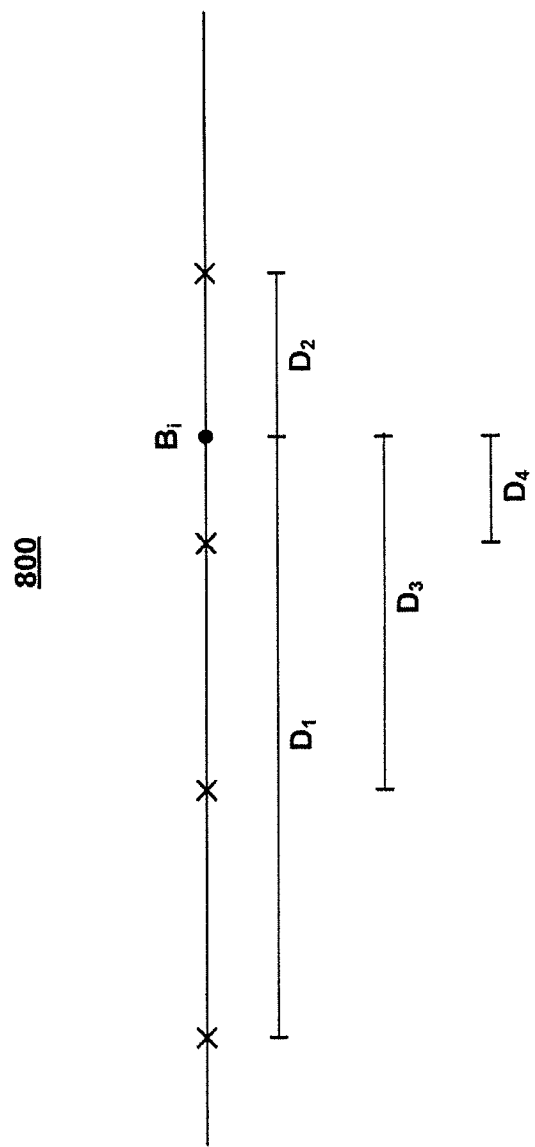

APPARATUS AND METHOD FOR FINDING LIKELY COMBINATIONS OF TRANSMITTED SYMBOLS

CROSS-REFERENCE TO RELATED APPLICATION

This application is a divisional of U.S. patent application Ser. No. 11/934,351, filed Nov. 2, 2007 (currently pending), which claims the benefit under 35 U.S.C. §119(e) of U.S. Provisional Application No. 60/864,653, filed Nov. 7, 2006, which are hereby incorporated herein by reference in their entireties.

BACKGROUND OF THE INVENTION

The disclosed technology relates generally to signal detection, and more particular to detecting signals received in a multiple-input multiple-output (MIMO) system using a K-Best MIMO detector.

With the continuing demand for higher-speed digital communications systems and higher-density digital storage systems, various techniques have been applied to increase the capacity of these systems. However, even with high-capacity communications and storage media, their respective bandwidths and densities are still limited. Therefore, MIMO systems are often used to fully exploit the capabilities of these systems. In particular, increasing the dimensions of these systems enables higher throughput and reliability, as more information can be conveyed without increasing the bandwidth of the system.

However, the efficiency gained by MIMO systems comes at the expense of a complex receiver design. In particular, a MIMO receiver may obtain a plurality of signals from its multiple receiver inputs, where each signal includes information from each of the multiple transmitter outputs. From all of this jumbled information, a MIMO detector can attempt to recover the independent information transmitted from each of the various transmitter outputs. Thus, to maintain high reliability, this information recovery process can be highly complex and low in throughput. Therefore, it would be desirable to provide low complexity, high throughput, and scalable architectures for detecting signals received from a MIMO system.

SUMMARY OF THE INVENTION

Accordingly, apparatus and methods are provided for a scalable K-Best MIMO detector with high throughput and low complexity.

Information in a digital communications or stage system can be transmitted from a source to a sink. To accurately transfer this information, a transmitter for transmitting the information may be used local to the source, and a receiver for accurately detecting the information can be used local to the sink. In some embodiments, such as in a wireless transmission system, the transmitter may include a plurality of transmit antennas and the receiver may include a plurality of receive antennas. Thus, the communications or storage system can be referred to as a multiple-input multiple-output (MIMO) system.

In accordance with an embodiment of the present invention, digital information from a transmitter can be estimated by a MIMO detector included in a MIMO receiver. For each transmitted signal from a transmit antenna, a plurality of metrics can be computed. Each metric may be associated with a possible symbol transmitted by that transmit antenna, as well as possible symbols transmitted by other transmit antennas, and preferably indicates the likelihood of these associated symbols. The computed metrics may be sorted into an order based on magnitude using a merge sort algorithm. A predetermined number, or K, of the sorted metrics can be selected by, for example, choosing the metrics with smallest magnitude. Thus, the selected metrics preferably correspond to combinations of symbols that are likely to have been transmitted from the transmit antennas. An estimate of transmitted digital information can be calculated based on the predetermined number of sorted metrics. The estimates may be soft information in the form of, for example, log likelihood ratios.

In some embodiments, the plurality of metrics can be calculated in a plurality of stages, where each stage is associated with a particular received signal. If the associated channel response matrix is upper triangular, or converted to be upper triangular, each stage preferably is also associated with a particular transmitted signal. The plurality of metrics can be sorted by sorting only those metrics within a same stage. From the sorted metrics for a particular stage, a predetermined number of intermediate metrics can be selected. The intermediate metrics may be associated with a subset of branches in a tree diagram (e.g., tree diagram 500 of FIG. 5), and may be selected for having the smallest magnitude. These intermediate metrics can be used by a next stage to calculate its plurality of metrics. Thus, the metrics computed in the next stage can be based on likely values of transmitted signals associated with previous stages. The predetermined number of selected metrics from a final stage, which preferably includes information about every transmit signal, can be used to estimate the digital information.

In accordance with another embodiment of the present invention, likely combinations of transmitted symbols in a MIMO system can be discovered. The likely symbols for each transmitted symbol can be found sequentially (e.g., the symbol transmitted from the final transmit antenna to the symbol transmitted from the first transmit antenna). A set of likely symbols for a particular transmitter output in the sequence can be found by first computing multiple sets of metrics, where each set of metrics preferably corresponds to a combination of symbols for other transmitter outputs. Also, each metric in a set of metrics preferably is associated with a possible symbol for the particular transmit output. Each set of metrics can be individually sorted using a merge sorting algorithm. The results of each set of sorted metrics can then be combined and sorted using a merge sorting algorithm. A predetermined number of these sorted metrics can be selected by, for example, selecting metrics with smallest value. These predetermined number of selected metrics can then be used to find the set of likely symbols for the next transmitter output in the sequence.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which:

FIG. 8 illustrates the operation of the detector stage of FIG. 7;

DETAILED DESCRIPTION OF THE INVENTION

Figure 1:
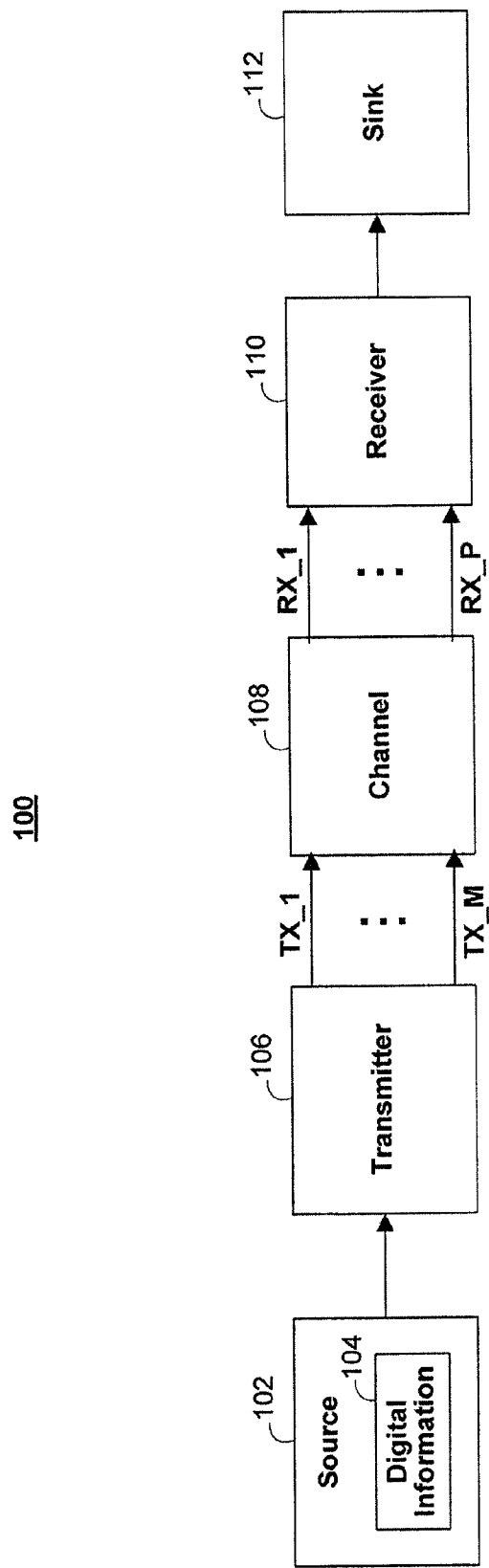
FIG. 1 shows a simplified illustrative multiple-input multiple-output (MIMO) digital communications or storage system.

FIG. 1 shows illustrative system 100 of a basic multiple-input multiple-output (MIMO) digital communications or storage system in accordance with an embodiment of the present invention. System 100 can include source 102, transmitter 106, receiver 110 and sink 112. System 100 can convey information, including digital information 104, from source 102 to sink 112 using transmitter 106 and receiver 110. Digital information 104 can represent any type of information to be conveyed to sink 112, such as a sampled/quantized version of an analog signal or binary information. Digital information 104 may be provided or generated by source 102. Source 102 can be any suitable type of digital information source including, but not limited to, a source encoder, a magnetic storage device (e.g., a hard disk), an electrical storage device (e.g., FLASH memory or RAM), or an optical storage device (e.g., a CD-ROM).

The information transferred from source 102 to sink 112 may travel through some transmission or playback medium. This medium is illustrated as channel 108 in FIG. 1. Channel 108 can represent any transmission or storage medium or media, and can alter information being transmitted through it.

Thus, transmitter 106 and receiver 110 can be used to accurately transmit and receive information through channel 108. In particular, transmitter 106 preferably conveys digital information 102 in a manner appropriate for transmission through channel 108, and receiver 110 preferably interprets received information based on the properties of channel 108. Transmitter 106 can have a plurality of outputs for transmitting information and receiver 110 can have a plurality of inputs for receiving information. For simplicity, the variable, M, will hereinafter represent the number of transmitter outputs, and the variable, P, will hereinafter represent the number of receiver inputs. Thus, transmitter 106 can have outputs TX_1, . . . , TX_M, and receiver 110 can have inputs RX_1, . . . , RX_P. Also, channel 108 may be referred to as a MIMO channel with M inputs and P outputs, or simply an M×P MIMO channel.

It should be understood that the enumeration of transmitter outputs (e.g., TX_1, . . . , TX_M) and receiver inputs (e.g., RX_1, . . . , RX_P) are for convenience only, and are not meant to suggest a particular ordering of the outputs. For example, it should not be assumed that the numbering is based on a spatial orientation of the various inputs/outputs, or that the enumeration suggests a relative priority of the various inputs/outputs.

Figure 2:
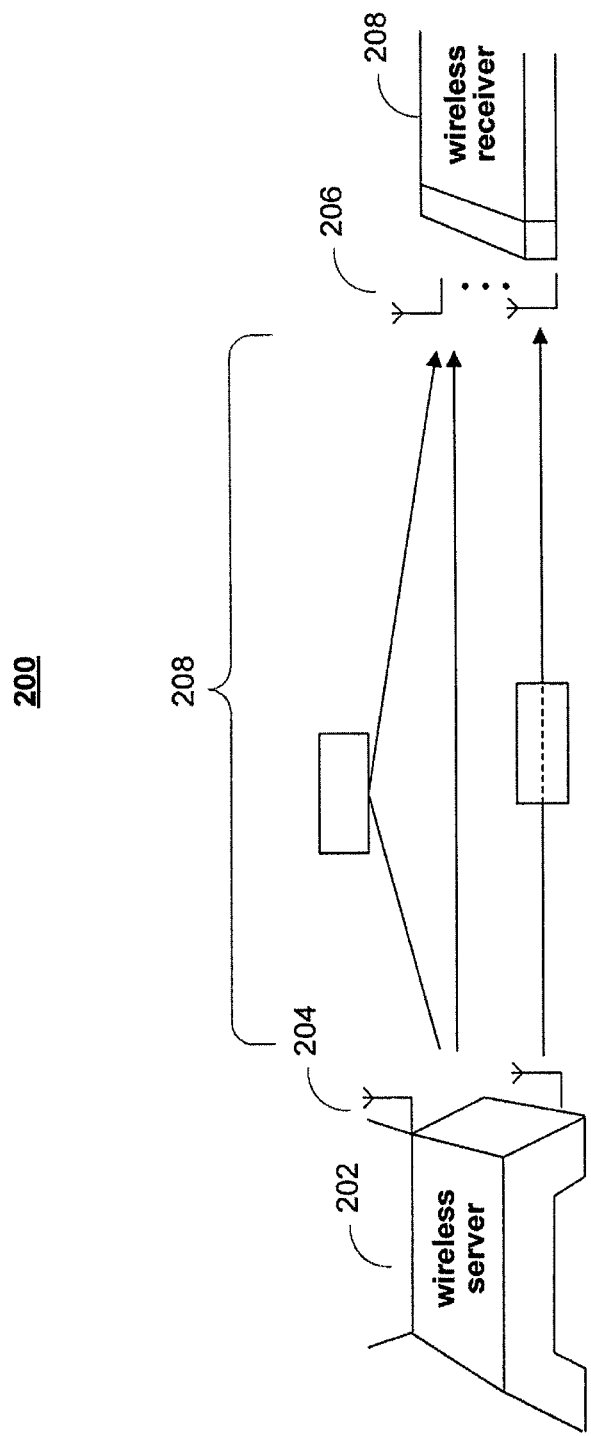
FIG. 2 shows an illustrative wireless communication system in accordance with an embodiment of FIG. 1.

Referring now to FIG. 2, illustrative wireless communication system 200 is shown in accordance with an embodiment of the present invention. Wireless system 200 may include any of the features and functionalities of the components in system 100 of FIG. 1. In this embodiment, wireless transmitter 202 may be a transmitter for broadcasting information wirelessly, such as a commercial gateway modem. Wireless transmitter 202 preferably transmits information from a source using M wireless antennas 204. Wireless receiver 206 can receive information wirelessly, and may be, for example, a commercial wireless computer adapter. Wireless receiver 206 can receive information transmitted from wireless transmitter 202 using P receive antennas 206, and may receive this information from channel 208. Channel 208 may include the space between transmit antennas 204 and receive antennas 206, and may include any structures within the space that may obstruct and attenuate the transmitted signals. For example, channel 208 can alter the transmitted signals due to at least multipath fades and shadowing effects.

Figure 3:
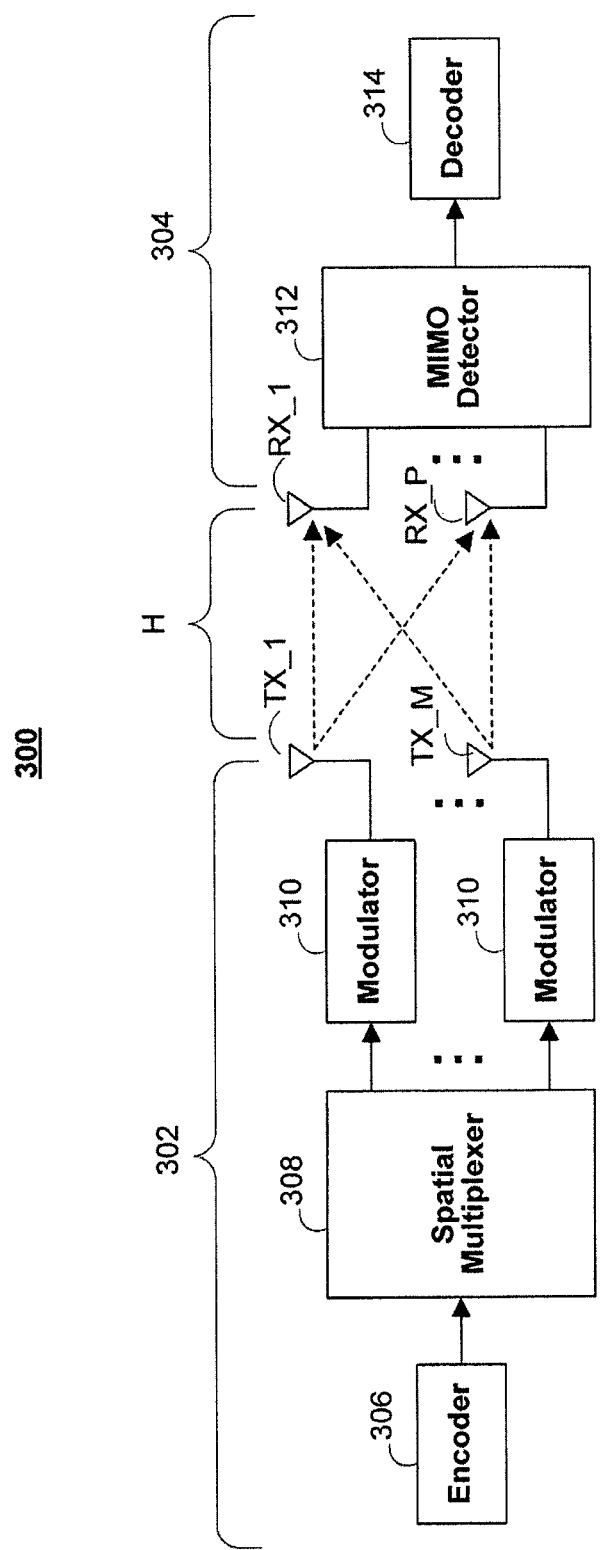
FIG. 3 shows an illustrative MIMO transmitter and receiver.

Referring now to FIG. 3, illustrative block diagram 300 is shown of transmitter 302 and receiver 304 in accordance with an embodiment of the present invention. Transmitter 302 and receiver 304 may have any of the features and functionalities of transmitter 106 and receiver 110 in FIG. 1, respectively. In some embodiments, transmitter 302 and receiver 304 may be a wireless transmitter and a wireless receiver, such as those shown in FIG. 2. Transmitter 302 can include encoder 306, spatial multiplexer 308, and modulators 310. Encoder 306 may encode digital information (e.g., digital information 104 of FIG. 1) based on any suitable error correcting or error detecting code. In some embodiments, encoder 306 may be a convolutional encoder, a Reed-Solomon encoder, or a CRC encoder or advanced encoding scheme such as convolutional turbo codes or low density parity check codes. Using these or another suitable error control code, encoder 306 may output a digital sequence with added redundancy that can improve the reliability of the overall system.

With continuing reference to FIG. 3, spatial multiplexer 308 preferably multiplexes the digital sequence provided by encoder 306 into M separate sequences. For example, multiplexer 308 may provide each successive bit, or group of bits, of the coded sequence to a different one of modulators 310.

Spatial multiplexer 308 may additionally include one or more interleavers to interleave the digital sequence prior to providing the M separate sequences. In some embodiments, multiplexer 308 may provide one or more bits of the coded sequence to more than one modulator. The particular sequence provided to one of the M modulators may be referred to as a transmit "stream."

Transmitter 302 can include M modulators, shown in FIG. 3 as modulators 310, for modulating the M separate sequences provided from spatial multiplexer 308. Each of modulators 310 preferably modulates its input digital sequence to a signal suitable for transmission through channel H. Each modulator preferably is associated with one of transmitter outputs TX_1, . . . . , TX_M. Thus, each of modulators 310 preferably provides one of the M output signals of transmitter 302. In some embodiments, such as in the wireless transmission system of FIG. 2, transmitter outputs TX_1, . . . , TX_M may be transmit antennas. Thus, for convenience, a transmitter output may be referred to as a transmit antenna. However, this is not intended to limit the present invention in any way.

With continuing reference to FIG. 3, modulators 310 preferably group bits of digital information into symbols of one or more bits. Modulators 310 preferably modulate these symbols to signals by adjusting the magnitude, phase, or a combination of magnitude and phase, of a suitable carrier signal. The carrier signal may have any suitable frequency (e.g., baseband signal, passband signal, etc.) and any suitable characteristics (a non-return-to-zero (NRZ) signal, etc.). The magnitude and phase of a signal associated with a particular symbol can be illustrated by a signal point in a signal constellation set representing the modulation scheme. Thus, to transmit a symbol, the carrier signal can be adjusted to the magnitude and phase of the signal point associated with that symbol for a period of time referred to as a "symbol period."

Figure 4A:
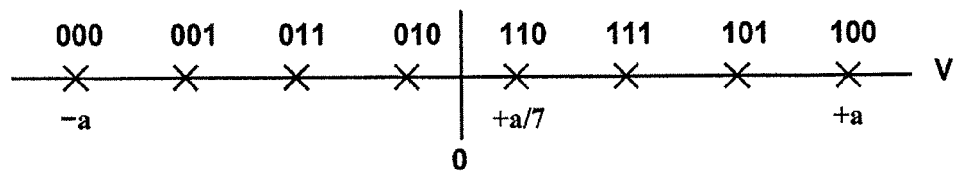
FIGS. 4A-4B show illustrative signal constellation sets that can be used by a modulator to transmit symbols.
Figure 4B:
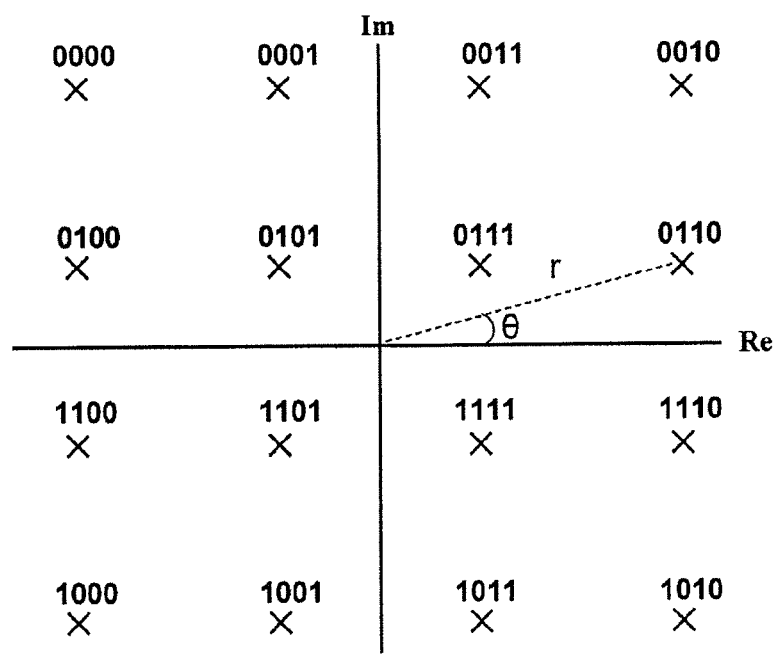

Referring now to FIGS. 4A-4B, illustrative signal constellation sets, corresponding to various modulation schemes, are shown that may be used by a modulator (e.g., each of modulators 310 of FIG. 3). Referring first to FIG. 4A, a one-dimensional (1D) signal constellation set is shown that may correspond to a pulse amplitude modulation (PAM) schemes. PAM schemes can transmit different symbols by varying the amplitude (e.g., voltage magnitude) of a carrier signal. FIG. 4A shows an 8-PAM signal constellation set for mapping three-bit symbols into eight signal amplitudes. One particular symbol-to-signal point mapping is shown in FIG. 4A. Using this particular mapping, symbol "001" may be transmitted with a signal magnitude of +a/7. However, it should be understood that this mapping is merely illustrative, and any other one-to-one mapping may be used.

Referring now to FIG. 4B, an illustrative two-dimensional (2D) signal constellation set is provided that can be used by a modulator (e.g., each of modulators 310 of FIG. 3) to modulate symbols. The 2D constellation set of FIG. 4B is shown on a complex number plane, where the horizontal axis represents real values and the vertical axis represents imaginary values. The illustrated constellation set may correspond to a quadrature amplitude modulation (QAM) scheme with 16 signal points, referred to as a 16-QAM modulation scheme. Each symbol can include four bits, and each symbol can be modulated to a signal point having a different amplitude, phase, or a combination of amplitude and phase. For example, using the shown symbol-to-signal point mapping, symbol "0110" can be modulated to an amplitude given by distance r and phase θ. However, it should be understood that this mapping is merely illustrative, and any other one-to-one mapping may be used.

For convenience, the number of total signal points in a constellation set will hereinafter be defined by a variable, Q. Thus, FIG. 4A shows a constellation set where Q=8, and FIG. 4B shows a constellation set where Q=16.

Referring back to FIG. 3, modulators 310 can use any suitable one-dimensional or multi-dimensional modulation scheme, and therefore any suitable signal constellation set, for converting symbols to signals. For example, modulators 310 may modulate symbols according to the 8-PAM or 16-QAM illustrated in FIGS. 4A and 4B, respectively. In other embodiments, modulators 310 can modulate symbols based on phase shift keying (PSK), frequency shift keying (FSK), or any other suitable modulation scheme.

It should be understood that transmitter 302 of FIG. 3 is merely illustrative. In particular, any of the components of transmitter 302 may be modified, omitted, or rearranged, or any additional components may be added, without departing from the scope of the invention. Furthermore, any of the components may be combined into a component with combined functionality.

With continuing reference to FIG. 3, receiver 304 can receive a plurality of signals from channel H. In particular, receiver 304 can include receiver inputs RX_1, . . . , RX_P for obtaining P signals from channel H. In some embodiments, such as in the wireless communications system of FIG. 2, inputs RX_1, . . . , RX_P may be receiving antennas. Thus, for convenience these inputs may be referred to as antennas. However, this is not intended limit the present invention in any way. In some embodiments, channel H may allow a signal transmitted from a particular transmit antenna, TX_i, to reach multiple receive antennas. Thus, the signal received by a given receiver antenna may be based on signals from multiple transmit antennas. In particular, a signal received by a receive antenna, RX_i, may be a linear combination of the signals provided by transmit antennas TX_1, . . . , TX_P. Thus, in matrix form, system 300 can be modeled by the equations, $$y_{P\times 1} = H_{P\times M} x_{M\times 1} + n_{P\times 1}, \text{ and} \quad (1)$$

$$\begin{bmatrix} y_1 \\ \vdots \\ y_P \end{bmatrix} = \begin{bmatrix} h_{11} & \cdots & h_{1M} \\ \vdots & \ddots & \vdots \\ h_{P1} & \cdots & h_{PM} \end{bmatrix} \begin{bmatrix} x_1 \\ \vdots \\ x_M \end{bmatrix} + \begin{bmatrix} n_1 \\ \vdots \\ n_P \end{bmatrix}. \quad (2)$$

Here, equation (2) is an expanded version of equation (1), where $y_{P\times 1}$ is a P-dimensional signal vector representing the signals received by the P inputs of receiver 304, $H_{P\times M}$ is a P×M matrix representing the effect of channel H, $x_{M\times 1}$ is a M-dimensional signal vector representing the signals transmitted by the M outputs of transmitter 302, and $n_{P\times 1}$ is a P-dimensional signal vector representing any additive noise affecting the transmitted signals. Thus, for example, the signal received by the first of inputs 314 may equal, $$y_1 = h_{11} x_1 + \ldots + h_{1m} x_M + n_1, \quad (3)$$

a weighted addition of symbols from transmit antennas TX_1, . . . , TX_M. In some embodiments of the present invention, receiver 304 may model each noise component of $n_{P\times 1}$ (e.g., $n_i$) as additive white Gaussian (AWG), where the noise at an input TX_i may not be correlated to the noise at any of the other inputs. However, the present invention is not limited to this particular embodiment.

Thus, with continuing reference to FIG. 3, to interpret the information transmitted by transmitter 302, receiver 304 can attempt to demultiplex the noisy, altered signals received by RX_1, . . . , RX_P to obtain the original M independent streams. To perform this complex task, receiver 304 can include MIMO detector 312 and decoder 314. MIMO detector 312 can be a detector that interprets the P received streams to estimate the M transmitted streams. Detector 312 can estimate the transmitted sequences using a suitable detection algorithm. As will be described in further detail in connection with FIG. 5, detector 312 preferably performs detection based on the K-Best algorithm.

Decoder 314 of receiver 304 can decode the streams from MIMO detector 312 into an estimate of the originally transmitted or played back information (e.g., digital information 104 of FIG. 1). Decoder 314 may be a decoder based on the error correcting or detecting code used by encoder 306. For example, if encoder 306 is an LDPC encoder, decoder 314 may be an LDPC decoder. In this way, decoder 314 can remove the redundancy added by encoder 316, and can correct or detect any errors that may remain after signal detection.

Figure 5:
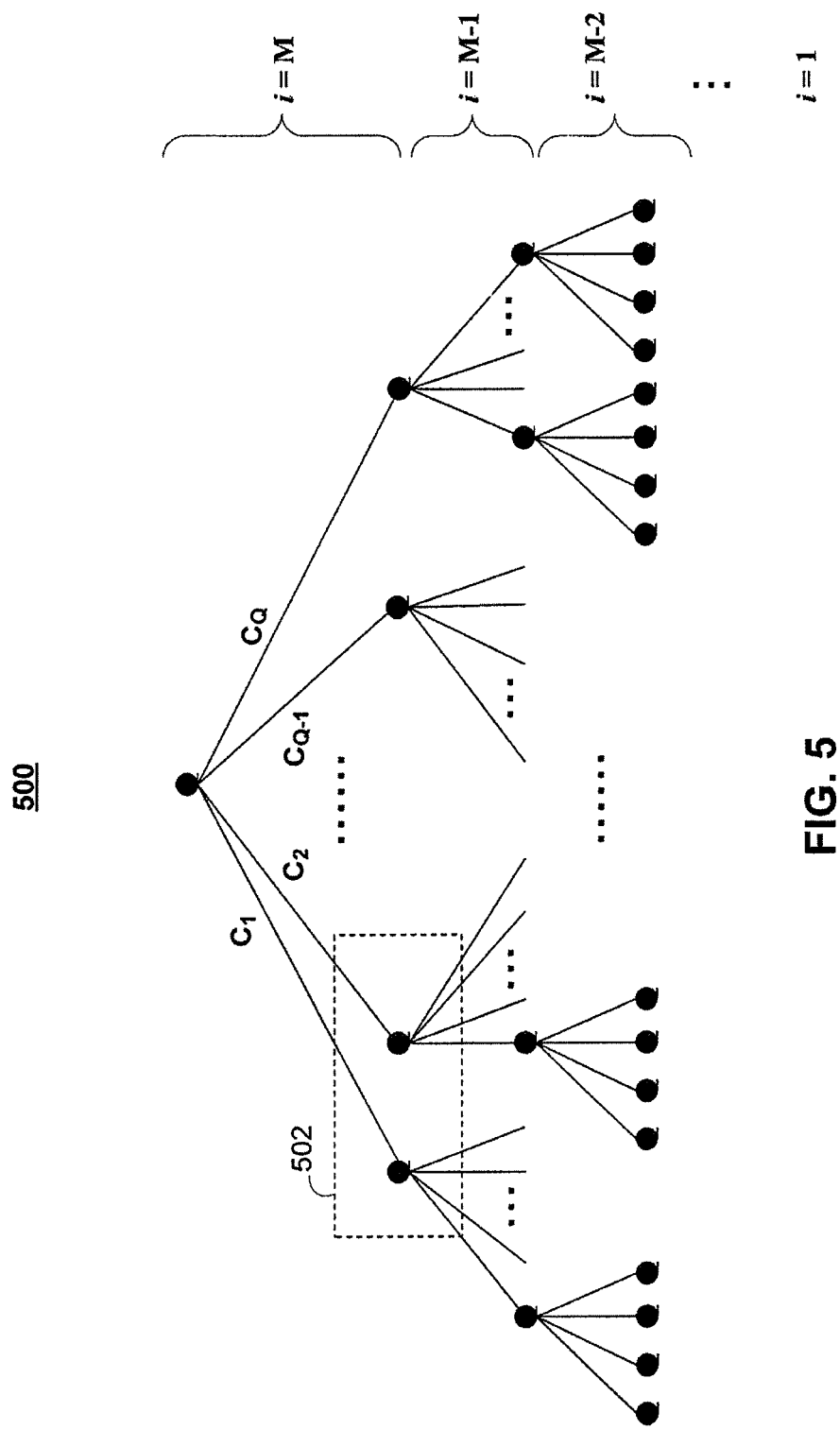
FIG. 5 shows an illustrative tree diagram that represents transmitted information in a MIMO system.

Referring now to FIG. 5, tree diagram 500 is shown that can illustrate each possible combination of symbols transmitted by a MIMO transmitter (e.g., transmitter 302 of FIG. 3). In particular, tree diagram 500 can illustrate the different combinations of symbols provided by antennas TX_1, ..., TX_M for a particular symbol period. Tree diagram 500 preferably includes M levels—one level for each transmitter output, TX_i. Each node in tree diagram 500 preferably has Q children branches, where each branch corresponds to a possible symbol in the corresponding modulation scheme. Thus, for the 8-PAM scheme of FIG. 4A, each node may have eight children branches for symbols "000," ..., "100." For the 16-QAM scheme of FIG. 4B, each node may have 16 children branches for each four-bit symbol.

With continuing reference to FIG. 5, tree diagram 500 preferably is organized such that the Mth transmitter output, TX_M, is shown as the top level of the tree. The Q branches for TX_M preferably lead to children nodes at the next level, which preferably corresponds to the (M−1)th transmitter output, TX_(M−1). Then, Q branches preferably lead away from each of these nodes to the (M−2)th transmitter output level. For simplicity, the level in tree diagram 500 corresponding to the ith transmitter output, TX_i, will hereinafter be referred to as the ith level. Thus, at each level i of tree diagram 500, every possible combination of symbols for transmitter outputs i, ..., M can be illustrated. For example, at the (M−2)th level, each combination of symbols for transmitter outputs TX_M, TX_(M−1), and TX_(M−2) is shown, for a total of $Q^3$ symbol combinations. For the 8-PAM scheme of FIG. 4A, there may be a total of 512 branches at this level, and for the 16-QAM scheme of FIG. 4B, there may be a total of 4096 branches at this level.

A particular detection algorithm used by a MIMO detector (e.g., detector 316 of FIG. 3) may find one or more paths through tree diagram 500. That is, to interpret information received from a channel, the detector may find one or more paths through tree diagram 500 that are likely to correspond to the path actually transmitted. For example, a maximum-likelihood detection algorithm can be used to find the most probable path through the tree diagram. To accomplish this, maximum-likelihood detection may involve finding the likelihood of each possible path through tree diagram 500. Because a total of $Q^M$ paths may exist in tree diagram 500, for MIMO systems with a large M, a large number Q, or large M and large Q, maximum-likelihood detection may be too complex to implement in practical detectors. Thus, the present invention preferably uses a less complex, yet still high performance, detection algorithm referred to as the K-Best detection algorithm. For illustrative purposes, the K-Best detection algorithm will be described briefly here.

With continuing reference to FIG. 5, a detector (e.g., MIMO detector 315 of FIG. 3) can systematically process a set of received signals using tree diagram 500 one level at a time. Detection for a particular symbol period can terminate once the signals have been processed for each level. Starting at the Mth (top) level, the detector can determine which K branches most likely correspond to the actual symbol transmitted by TX_M. In particular, based on the P received signals, the detector can determine the most probable K, or "K best," symbols transmitted by TX_M. If the channel matrix is upper triangular, or can be made upper triangular, the detector can base its decision on only the Pth detector input, RX_P. This preferably results in significant complexity savings, as only one, rather than up to P, receiver inputs can be considered. In matrix form, if the channel matrix can be converted to a format given by, $$B_{P \times 1} = R_{P \times M} x_{M \times 1} + n_{P \times 1}, \text{ or} \tag{4}$$

$$\begin{bmatrix} B_1 \\ \vdots \\ B_P \end{bmatrix} = \begin{bmatrix} r_{11} & \cdots & \cdots & R_{M1} \\ 0 & r_{22} & \ddots & \vdots \\ \vdots & \ddots & r_{33} & \vdots \\ h_{P1} & \cdots & 0 & r_{MM} \end{bmatrix} \begin{bmatrix} x_1 \\ \vdots \\ x_M \end{bmatrix} + \begin{bmatrix} n_1 \\ \vdots \\ n_P \end{bmatrix}, \tag{5}$$

then the Pth receiver input signal, $B_P$, may be given by, $$B_P = r_{MM} x_M + n_P. \tag{6}$$

Note that, for simplicity, the R matrix in equation (5) is assumed to be square (e.g., M=P). However, this is merely illustrative.

With continuing reference to FIG. 5, after K best branches have been selected from Mth (top) level processing, the resulting K nodes can be considered in the next, (M−1)th level. Thus, this level (and each successive level) can choose the best K branches from K×Q possible branches. For example, assume K=2 and the 8-QAM scheme illustrated in FIG. 4A. Also assume the two nodes shown in region 502 represent the K best selections from Mth level processing. Then, K=2 branches can be chosen based on the K×Q=2× 8=16 branches leading away from region 502. As illustrated in equation (6), if the channel matrix is upper triangular, or can be made upper triangular, the decision for the (M−1)th level, and therefore the estimate for TX_(M−1) and TX_M, can depend on only RX_(M−1) and RX_M. As the Mth receiver input may have taken care of the possibilities for the Mth transmitter output in the Mth level processing, the (M−1)th level processing can be based substantially on the RX_(M−1)input. Thus, processing received signals with tree diagram 500 can continue in the above described manner, where the ith level can be processed based substantially on the RX_i input.

It should be understood that the description of the K-Best algorithm described above is merely illustrative, and is not meant to limit the present invention in any way. In fact, some embodiments of the invention can be used with other detection algorithms, such as maximum-likelihood detection, sphere decoding, zero-forcing decoding, or a modified or combined version of any of these detection algorithms. This will be discussed in greater detail below.

Note that tree diagram 500 assumes that any combination of symbols may be possible for the M transmitter outputs. It should be understood, however, that tree diagram 500 may be modified if certain combinations of symbols are not possible.

For example, an error control code may be implemented by, for example, encoder 306 that prevents particular combinations of symbols to be transmitted concurrently from TX_1, ..., TX_M. In these embodiments, tree diagram 500 can be modified to remove paths that represent these particular combinations of symbols.

Figure 6:
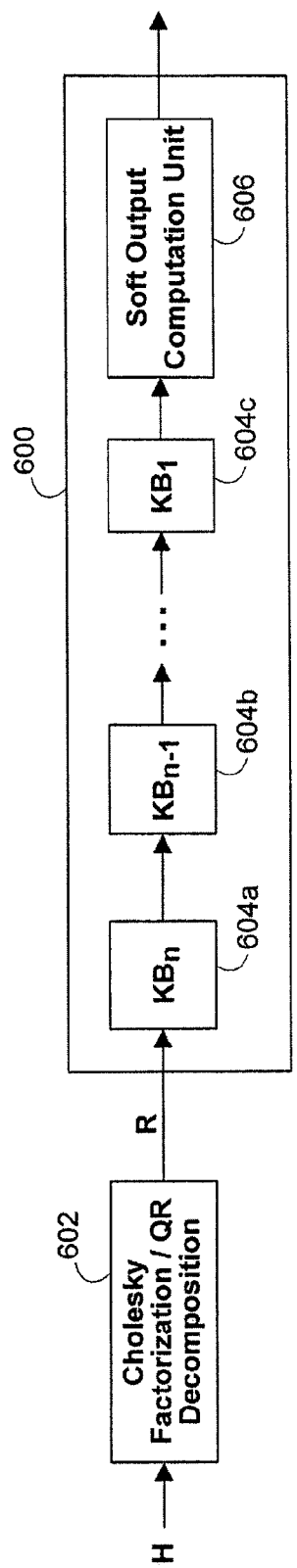
FIG. 6 shows an illustrative K-Best MIMO detector.

Referring now to FIG. 6, illustrative MIMO detector 600 is shown that can implement a K-Best detection algorithm in accordance with an embodiment of the present invention. MIMO detector 600 can include a plurality of K-Best (KB) stages 604a-604c, which may be pipelined stages, and soft output computation unit 606. The variable, N, hereinafter refers to the number of KB stages included in a MIMO detector (e.g., MIMO detector 600) of the present invention. The value of N preferably is based on the number of transmit antennas, M, and therefore preferably is based on the number of levels in an associated tree diagram (e.g., tree diagram 500 of FIG. 5). Detector 600 preferably has a scalable architecture, as detector 600 can be altered by simply adding or removing detector stages 604 if a different sized MIMO system is desired.

With continuing reference to FIG. 6, in some embodiments of the present invention, N may equal the number of transmit antennas, M. In these embodiments, each KB stage may be associated with a level of a particular tree. That is, $KB_i$ may perform the processing described above associated with the ith level of the tree diagram. If the received signals are obtained from an upper triangular channel, stages $KB_3$, ..., $KB_1$ may process received signals from receive antennas RX_8, ..., RX_1, respectively. Other embodiments of detector 600 will be described in greater detail below.

Thus, except for the Nth stage, each KB stage of detector 600 preferably provides K outputs for a next detector stage based on the K inputs of a previous detector stage. For a given stage i, the K inputs preferably correspond to K nodes in the ith level of a tree diagram (e.g., tree diagram 500 of FIG. 5) Similarly, the K outputs preferably correspond to K branches leading away from the K nodes in the ith level. These K branches preferably lead to K nodes, or inputs, in the next level. Thus, for convenience and where appropriate, an input of a detector stage may be referred to as a "parent node," where each parent node is associated with a particular combination of transmit symbols. Also, an output of a detector stage may be referred to as a "branch," where the branch may be associated with the parent node of a next detector stage. As stages $KB_M$, ..., $KB_2$ produce branches that are used by another stage, any processing performed by these stages may be referred to as "intermediate." Similarly, as stage $KB_0$ preferably provides an output from the detector stages, this stage is preferably referred to as a final stage.

With continuing reference to FIG. 6, soft output computation unit 606 of detector 600 can compute soft information. Unit 606 can compute soft information using information (e.g., probabilities) on the K best paths provided by KB stages 605a-605c. In some embodiments, unit 606 may calculate soft information in the form of log-likelihood ratios (LLR). In particular, soft output computation unit 606 may provide an output where the sign of the output indicates the most likely value of the bit (e.g., most likely '1' if positive and most likely '0' if negative) and the magnitude of the output indicates the confidence or strength of the decision. This may be provided to a soft decoder (e.g., decoder 314 of FIG. 3), which performs decoding based on soft information.

As described above in connection with FIG. 5, the K-Best detection algorithm preferably operates on signals received from a channel, where the channel can be modeled as an upper triangular matrix. Because the channel (e.g., channel H of FIG. 3) can be a full non-zero matrix, the channel can be triangularized by preprocessor 602. Preprocessor 602 preferably converts a full channel matrix, H, into an upper triangular matrix, R. In some embodiments, preprocessor 602 may triangularize the channel matrix using QR decomposition. That is, preprocessor 602 may decompose channel matrix H into an orthogonal, unitary matrix Q and an upper triangular matrix R, where H=QR. Preprocessor 602 may implement QR decomposition using Gram-Schmidt orthogonalization or another suitable implementation. In other embodiments, preprocessor 602 may triangularize the channel matrix using Cholesky factorization. That is, preprocessor 602 may decompose channel matrix H such that H=LL★, where L is lower triangular and L★ is the upper triangular, conjugate transpose of L. Preprocessor 602 may implement Cholesky factorization using the Cholesky algorithm or using any other suitable implementation.

Figure 7:
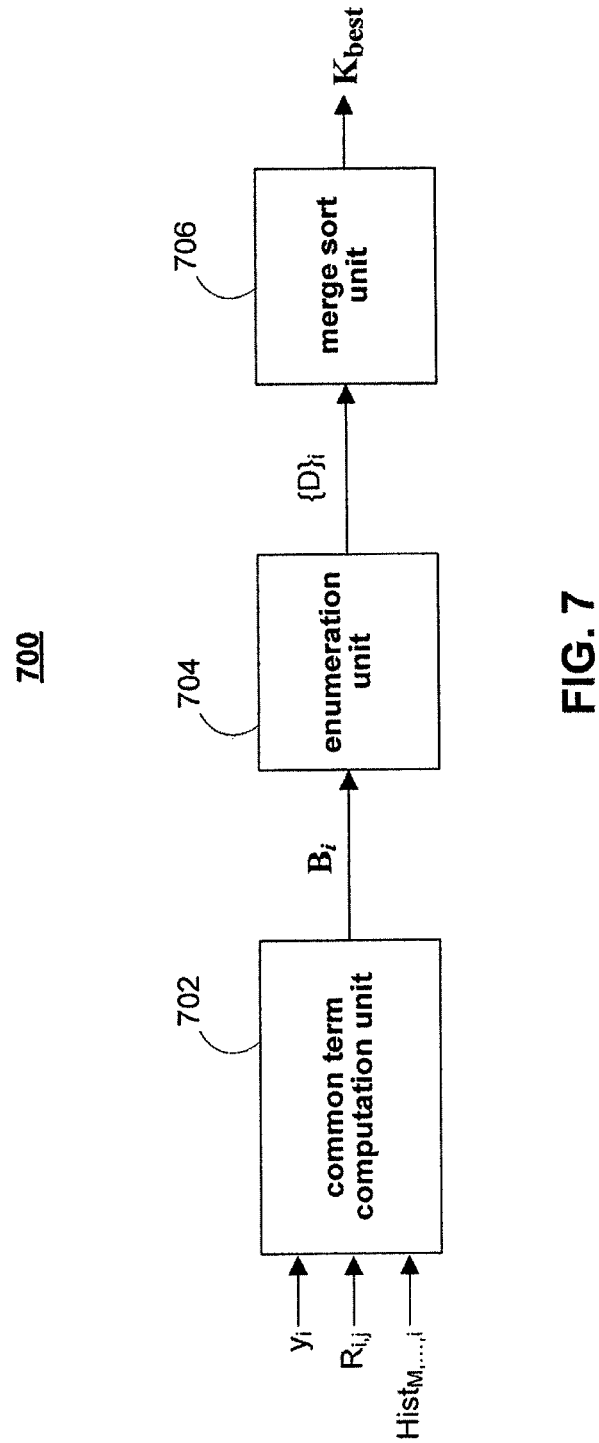
FIG. 7 shows a simplified block diagram of a stage of the K-Best MIMO detector of FIG. 6.

Referring now to FIG. 7, illustrative detector stage 700 is shown for obtaining the K best symbols for a particular transmit antenna, i, in accordance with an embodiment of the present invention. Detector stage 700 may be a more detailed, yet still simplified, view of one of stages 604 in detector 600 (FIG. 6). Thus, detector stage 700 may have any of the features and functionalities of any of stages 604. Detector stage 700 preferably includes common term computation unit 702, enumeration unit 704, and merge sort unit 706, each of which will be described in greater detail below.

Common term computation unit 702 preferably processes a received signal, $y_i$, where $y_i$ preferably is received from the RX_i antenna of a MIMO receiver. The resulting processed signal may be referred to as signal $B_i$. In some embodiments, computation unit 702 can process the ith received signal based on the K best outputs from a previous detector stage. That is, if stage 700 corresponds to the kth KB stage in FIG. 6, computation unit 702 can process the received signal based on the outputs of the (k+1)th KB stage. This input is illustrated as $Hist_{M, ..., i}$ in FIG. 7. In some embodiments, computation unit 702 can process the received signal differently for each of the K best outputs from the previous stage. The processing preferably reduces the interference from other transmit antennas such that the value of the resulting processed signal depends substantially on the ith transmit antenna, TX_i. That is, assuming a particular combination of symbols from transmitter TX_(i+1), ..., TX_M derived from a parent node, computation unit 702 preferably reduces the effect of these symbols on RX_i. As there can be K parent nodes, for convenience, the processed signal for the ith received signal and the jth parent node may be defined by the symbol, $B_{i,j}$. Computation unit 702 can process the received signal for these different outputs in parallel or sequentially.

Common term computation unit 702 can also process received signal $y_i$ based on the preprocessing performed on its corresponding channel matrix (e.g., by channel preprocessor 602 of FIG. 6). Otherwise, detector stage 700 may attempt to detect $y_i$ assuming an associated channel matrix of R, rather than its actual channel matrix of H. Thus, computation unit 702 may process the received signal such that processed signal $B_i$ may appear to be a signal received from channel R. That is, computation unit 702 may convert $y_i$, where $$y_i = \sum_{j=1}^{M} h_{ij} x_M + n_M, \qquad (7)$$

into, $$B_i = \sum_{j=1}^{M} r_{ij} x_M + n_M. \quad (8)$$

Detector stage 700 can then properly detect the processed signal assuming an associated channel matrix of R. In other embodiments of the present invention, processing the received signal based on R can be performed by a processor external to detector stage 700. In fact, processing based on R can be performed using a single external processor for multiple $y_i$s, rather than separately with a processor in each stage. In this way, processing based on R may be completed even before starting detection. For example, referring back to FIG. 6, processing based on R can be performed in preprocessor 602 or in a separate processor coupled to preprocessor 602 (not shown).

Referring now to FIG. 8, the operation of common term computation unit 702 can be illustrated in accordance with an embodiment of the present invention. Signal constellation set 800 can include four signal points. Thus, constellation set 800 can be a complete 4-PAM constellation set or a subset of a larger signal set. The signal points of signal set 800 preferably correspond to the expected values of $B_{i,j}$, or $E[B_{i,j}]$, for different possible symbols transmitted from antenna TX_i, assuming parent node j (e.g., a particular combination of symbols transmitted from antennas TX_(i+1), . . . , TX_M). Thus, to compare signal $y_i$ with the constellation points of set 800, common term computation unit 702 can process signal $y_i$ using any of the techniques described above. The resulting processed signal, $B_{i,j}$, can map onto constellation set 800 at some point relative to the other signal points. For the example of FIG. 8, $B_{i,j}$ can map onto a point between the rightmost two signal points of constellation set 800. $B_{i,j}$, however, can map onto any point on the line graph in FIG. 8, as there may be any degree of noise (e.g., $n_i$ in equation (2)) affecting the received signal.

Referring back to FIG. 7, common term computation unit 702 can output a processed signal, $B_{i,j}$. Using this processed signal, enumeration unit 704 preferably computes a plurality of metrics. In some embodiments, for a given $B_{i,j}$, enumeration unit 704 may compute a metric associated with each signal point in a constellation set. Enumeration unit 704 can compute metrics based on the distance of the processed signal to each signal point in the constellation set. For example, in FIG. 8, enumeration unit 704 can compute four metrics, where the metrics are based on distances $D_1, D_2, D_3$, and $D_4$. These distances may be Euclidean distances or any other suitable distance calculation. Thus, in some embodiments, enumeration unit 704 can compute metrics according to $\|B_i - R_{ii}C_j\|^2$. In other embodiments, to prevent from having to implement a square function (e.g., a multiplier), enumeration unit 704 can compute an approximate linear metric according to $|B_i - R_{ii}C_j|$. In still other embodiments, and for multidimensional signal constellation sets, enumeration unit 704 may compute an approximate linear metric according to $|\text{Im}\{B_i - R_{ii}C_j\}| + |\text{Re}\{B_i - R_{ii}C_j\}|$. For convenience, the collection of metrics (e.g., $D_1, D_2, D_3$, and $D_4$ in FIG. 8) computed by an enumeration unit (e.g., enumeration unit 704) for processed signal $B_{i,j}$ will hereinafter be represented by a symbol, $\{D\}_{i,j}$.

Enumeration unit 704 of FIG. 7 can compute a set of metrics for each of the K best symbols from a previous detector stage. That is, for each $B_{i,j}$, enumeration unit 704 can compute a set of metrics, $\{D\}_{i,j}$. Thus, for each symbol period, enumeration unit 704 preferably computes a plurality of metrics corresponding to $\{D\}_{i,j}, \ldots, \{D\}_{i,k}$, or simply $\{D\}_i$. In some embodiments of the present invention, enumeration unit 704 may include multiple copies of any suitable computational circuitry or structures to compute each set of metrics in parallel. In other embodiments, enumeration unit 704 may reuse computational structures by computing each set sequentially. Computing the sets in series may be advantageous if computation unit 702 provides the processed signals, $B_{i,j}$, in series.

With continuing reference to FIG. 7, merge sort unit 706 can find the K best signals based on the K×Q metrics $\{D\}_i$ provided by enumeration unit 704. Merge sort unit 706 preferably sorts the metrics of $\{D\}_i$ into an ascending or descending order. Because a smaller metric may indicate a more probable symbol, merge sort unit 706 can choose K symbols with the smallest metrics. That is, depending on whether an ascending or descending order of metrics is achieved, merge sort unit 706 can select the first or last K metrics as the best K branches. Merge sort unit 706 may provide these K best branches to the (i−1)th detector stage. If the current detector stage is the final stage in a detector (e.g., $KB_0$ in FIG. 6), merge sort unit 706 may provide the K best branches to a soft or hard output generator (e.g. soft output computation unit 606 in FIG. 6).

Figure 9A:
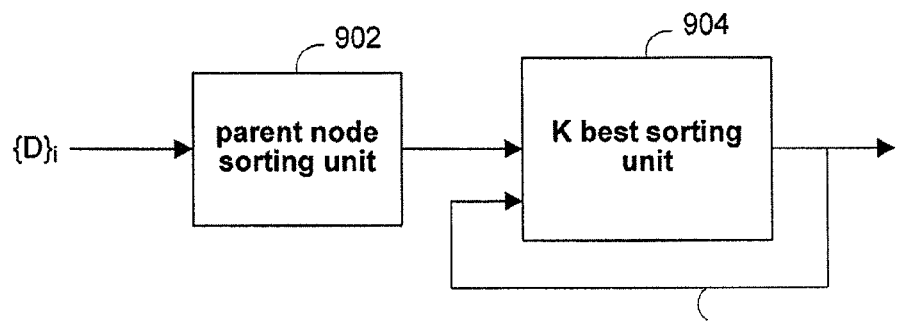
FIG. 9A shows a more detailed, yet still simplified, block diagram of a merge sort unit in a stage of a K-Best MIMO detector.

Referring now to FIG. 9A, illustrative merge sort unit 900 is shown in accordance with an embodiment of the present invention. Merge sort unit 900 may be a more detailed, yet still simplified, embodiment of merge sort unit 706 in FIG. 7. Merge sort unit 900 can include parent node sorting unit 902 and K-Best sorting unit 904, each of which will be described in greater detail below.

Parent node sorting unit 902 preferably sorts metrics for a given parent node. That is, parent node sorting unit 902 can sort metrics $\{D\}_{i,j}$ associated with antenna RX_i and parent node j. Thus, sorting unit 902 may sort up to Q metrics for the Q possible symbols associated with parent node j. Sorting unit 902 preferably sorts these metrics using a merge sorting algorithm. The merge sorting algorithm may enable some or all of the metrics to be sorted substantially concurrently. Thus, merge sort unit 902 preferably has high throughput. If a hardware implementation is used, merge sort unit 902 may sort the metrics within a clock cycle. In other embodiments, parent node sorting unit 902 can include a plurality of subunits for performing intermediate-sized merge sorts. For hardware implementations, some of these subunits may operate in a single clock cycle or may be pipelined.

In some embodiments, parent node sorting unit 902 may receive each set of metrics, $\{D\}_{i,j}$, for the K parent nodes sequentially. That is, sorting unit 902 may receive sets $\{D\}_{i,k}, \ldots, \{D\}_{i,j}$ one set at a time. In these embodiments, sorting unit 902 preferably provides these sets at its output, sorted by value. In particular, at each time interval (e.g., clock cycle), parent node sorting unit 902 may provide a different set of sorted metrics. Thus, sets of sorted information can be provided to K-Best sorting unit 904 sequentially.

With continuing reference to FIG. 9A, K-Best sorting unit 904 is shown for combining and sorting the sequentially provided sets of sorted metrics from parent node sorting unit 902. In particular, K-Best sorting unit 904 preferably sorts K best metrics computed thus far with a new set of sorted metrics from parent node sorting unit 902. For example, after a given time, K-Best sorting unit 904 may have combined and sorted metrics for TX_(i+1), . . . , TX_M. At the next time interval, the sorted metrics for these transmit antennas may be sorted with the sorted metrics for TX_i provided by parent node sorting unit 902. Thus, after this next time interval, K best sorting unit 904 preferably provides the K best metrics for antennas TX_i, ..., TX_M. This result may again be used as next set of sorted metrics provided by parent node sorting unit 902. Therefore, to continually update its K best metrics, the output of K-Best sorting unit 904 may be fed back as an input via feedback path 906. In some embodiments, feedback path 906 may additionally include a buffer for storing the current K best paths, such that these K best paths may be available for sorting with a new set of sorted metrics.

Figure 9B:
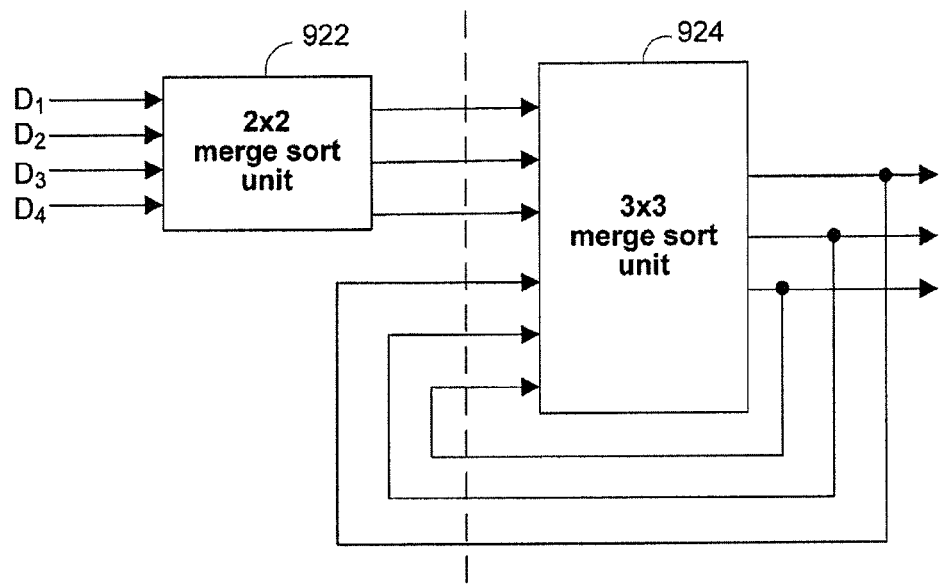
FIG. 9B shows an embodiment of the merge sort unit of FIG. 9A.

Referring now to FIG. 9B, merge sort unit 920 is provided for sorting the metrics of a Q=4 signal constellation set in accordance with an embodiment of the present invention. Merge sort unit 902 may be a particular embodiment of merge sort unit 900 of FIG. 9A for Q=4 and K=3. Thus, merge sort unit 902 may be used with a 4-PAM modulation scheme, or any other modulation scheme with four signal points, and can be used to sort metrics based on $D_1$, $D_2$, $D_3$, and $D_4$, described above in connection with FIG. 8. Merge sort unit 920 preferably includes 2×2 merge sort unit 922 and 3×3 merge sort unit 924, which will each be described in detail below.

In FIG. 9B, 2×2 merge sort unit 922 preferably has four inputs corresponding to metrics based on $D_1$, $D_2$, $D_3$, and $D_4$. In one (or more) clock cycles, 2×2 merge sort unit 922 preferably sorts these metrics using a merge sorting algorithm. Because only K total metrics may eventually be provided, 2×2 merge sort unit 922 may only output the K=3 best (e.g., lowest) metrics. The result of the highest metric is preferably discarded. Thus, in some embodiments, 2×2 merge sorting unit 922 may provide sorted metrics for the K=3 best of $D_1$, $D_2$, $D_3$, and $D_4$ for each of M transmit antennas in successive time intervals.

With continuing reference to FIG. 9B, 3×3 merge sort unit preferably provides the K best outputs for a current stage. In particular, 3×3 merge sort unit 924 may sort the sorted metrics provided by 2×2 merge sort unit 922. As only K=3 final metrics may be needed, 3×3 merge sort unit 924 preferably discards any metrics that do not fall within the best K metrics. The K retained metrics may then be compared to the a next set of sorted metrics, where only the best three of six metrics preferably are retained. In some embodiments, 3×3 merge sort unit 924 may perform the 3×3 merge sort in a single clock cycle. Thus, in embodiments where both 2×2 merge sort unit 922 and 3×3 merge sort unit 924 complete their respective sorts in a single clock cycle, only one pipelined stage may be needed. This pipelined stage is illustrated in FIG. 9B as a dotted line.

Examples of the present invention provided thus far have focused primarily on real (e.g., PAM) signal sets. It should be understood that any of the above described techniques and examples may be extended directly to complex (e.g., QAM) signal sets. In other embodiments, rather than considering a QAM signal set to be within a complex domain, the signal set may be modeled within the real domain. In particular, the M-dimensional complex signal model for the M transmit antennas may be converted into a 2M-dimensional real signal model according to $$\begin{bmatrix} \text{Re}\{y\} \\ \text{Im}\{y\} \end{bmatrix} = \begin{bmatrix} \text{Re}\{H\} & -\text{Im}\{H\} \\ \text{Im}\{H\} & \text{Re}\{H\} \end{bmatrix} \begin{bmatrix} \text{Re}\{c\} \\ \text{Im}\{c\} \end{bmatrix} + \begin{bmatrix} \text{Re}\{n\} \\ \text{Im}\{n\} \end{bmatrix}. \quad (9)$$

This conversion may result in significant throughput gains, as the number of total number of signal points in the constellation set is reduced considerably. For the 16-QAM signal set shown in FIG. 4B, equation (9) produces an 8-dimensional signal vector, as each original dimension is reduced to four signal points (a square root decrease), and the number of real dimensions double (a linear increase). Thus, although the number of real dimensions increase, the increase is significantly less than the decrease in the number of signal points per dimension.

In some embodiments of the present invention, a complex signal set (e.g., QAM) may be implemented by doubling the number of detector stages. In particular, each transmit antenna may be associated with two detector stages—one stage to process $\text{Re}\{y_i\}$ and the other to process $\text{Im}\{y_i\}$. Thus, a detector such as detector 600 in FIG. 6 may include up to double the number of stages, N, as number of transmit antennas, M. In comparison to a detector with stages that process $y_i$, the complexity of each stage preferably is considerably reduced, while the number of stages preferably increases linearly. The throughput of the detector can be significantly decreased if each of stage can more than halve the amount of processing time. For the 16-QAM described above in connection with FIG. 4B, the number of stages preferably increases from M to 2M stages, while the number of signal points considered by each stage preferably is reduced from 16 to four. Thus, in some embodiments, each stage of the 16-QAM MIMO detector may be similar to a stage for a 4-PAM MIMO detector. That is, each stage of the 16-QAM MIMO detector may include components similar to those illustrated above in connection with FIGS. 8 and 9B.

Figure 10:
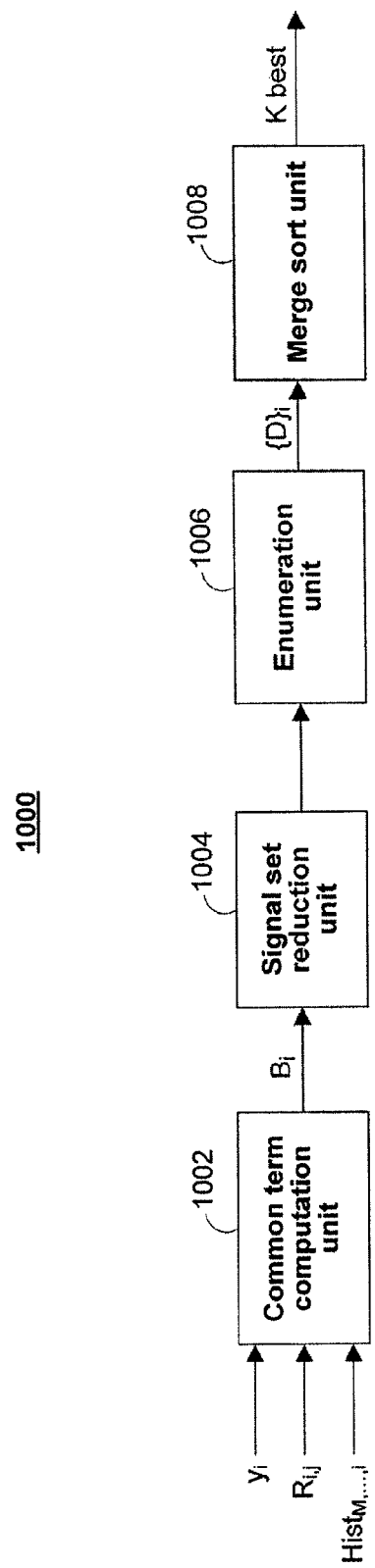
FIG. 10 shows a simplified block diagram of a stage of a K-Best MIMO detector that includes a unit for reducing the number of constellation points considered in the stage.

Referring now to FIG. 10, an illustrative block diagram of detector stage 1000 for reducing the complexity of detection is shown in accordance with an embodiment of the present invention. Detector stage 1000 preferably includes common term computation unit 1002, signal set reduction unit 1004, enumeration unit 1006, and merge sort unit 1008. Detector stage 1000 has many similar components as detector stage 700 of FIG. 7. In particular, detector stages 700 and 1000 both include a common term computation unit, an enumeration unit, and a merge sort unit. Therefore, the description of detector stage 1000 will be kept brief and will focus primarily on differences between detector stage 700 and detector stage 1000. However, it should be understood that any of the features and functionalities of detector stage 700 can be included in detector stage 1000.

With continuing reference to FIG. 10, signal set reduction unit 1004 can reduce the number of signal constellation points considered by the detector stage. In particular, reduction unit 1004 can find a subset of the total signal constellation point by removing constellation points that are very unlikely to correspond to the actually transmitted signal point. In some embodiments, reduction unit 1004 may divide the possible values of a processed received signal from common term computation unit 1002 into a plurality of regions. The subset of signal points chosen may depend on the particular region that a processed received signal maps into. In this way, the complexity of enumeration unit 1006 can be reduced, as it preferably does not calculate as many metrics. Additionally, the complexity, and possibly the throughput, of merge sort unit 1008 can be reduced, as fewer metrics preferably are sorted. The variable, C, will hereinafter define the total number of signal constellation points chosen by signal set reduction unit 1004.

Figure 11A:
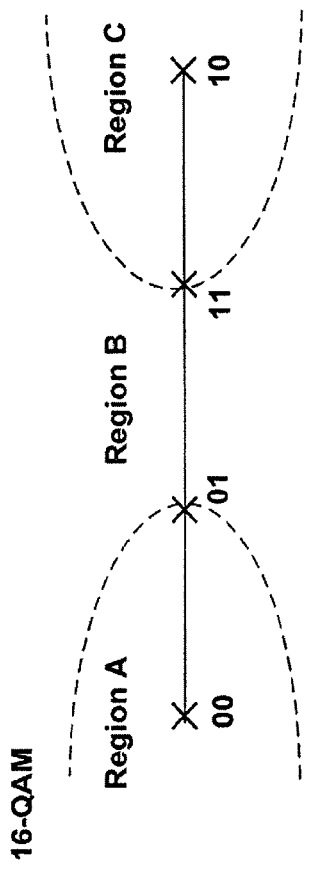
FIGS. 11A-11B show illustrative regions in signal constellation sets.
Figure 11B:
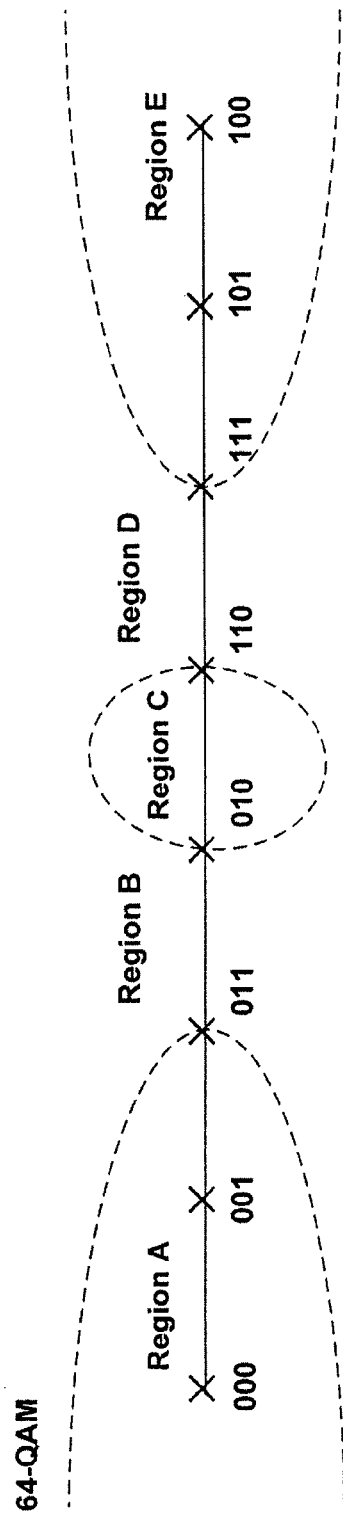

Referring now co FIGS. 11A-11B, an illustration of the regions of signal set reduction unit 1004 (FIG. 10) is shown. FIG. 11A illustrates possible regions for a dimension of a 16-QAM signal set (described above in connection with FIG. 4B), and FIG. 11B illustrates possible regions for a dimension of a 64-QAM signal set. The number of regions may depend on the number of total signal points in the constellations set.

For example, the four-point real constellation set of a 16-QAM scheme may have three regions, identified in FIG. 11A as regions A, B, and C, while the eight-point real constellation set of a 64-QAM may have five regions, identified in FIG. 11B as regions A, B, C, D, E. However, it should be understood that any suitable number of regions may be used for these regions, and their boundaries may be at any suitable location on the line graphs.

With continuing reference to FIGS. 11A and 11B, the particular symbols chosen by a signal set reduction unit (e.g., reduction unit 1004 of FIG. 10) preferably depend on the region that an input signal maps into. The input signal may be a processed signal from a common term computation unit (e.g., common term computation unit 1002 of FIG. 10). Thus, the resulting symbols chosen by the reduction unit may correspond roughly to a set of symbols with constellation points within or closest to the region associated with an input signal. For example, referring to FIG. 11B, if an input signal with a value in region D is chosen, each symbol except for "000" and "001" may be selected. In some embodiments, the subset of signal points for each region may be selected using a table lookup or other suitable selection mechanism. It should be understood that a signal set reduction unit (e.g., reduction unit 1004 of FIG. 10) can output any suitable number of signal points. To improve the performance of the detector stage, a large number of signal points may be selected. To improve the throughput or to decrease the complexity of the system, a fewer number of signal points may be selected.

Figure 12:
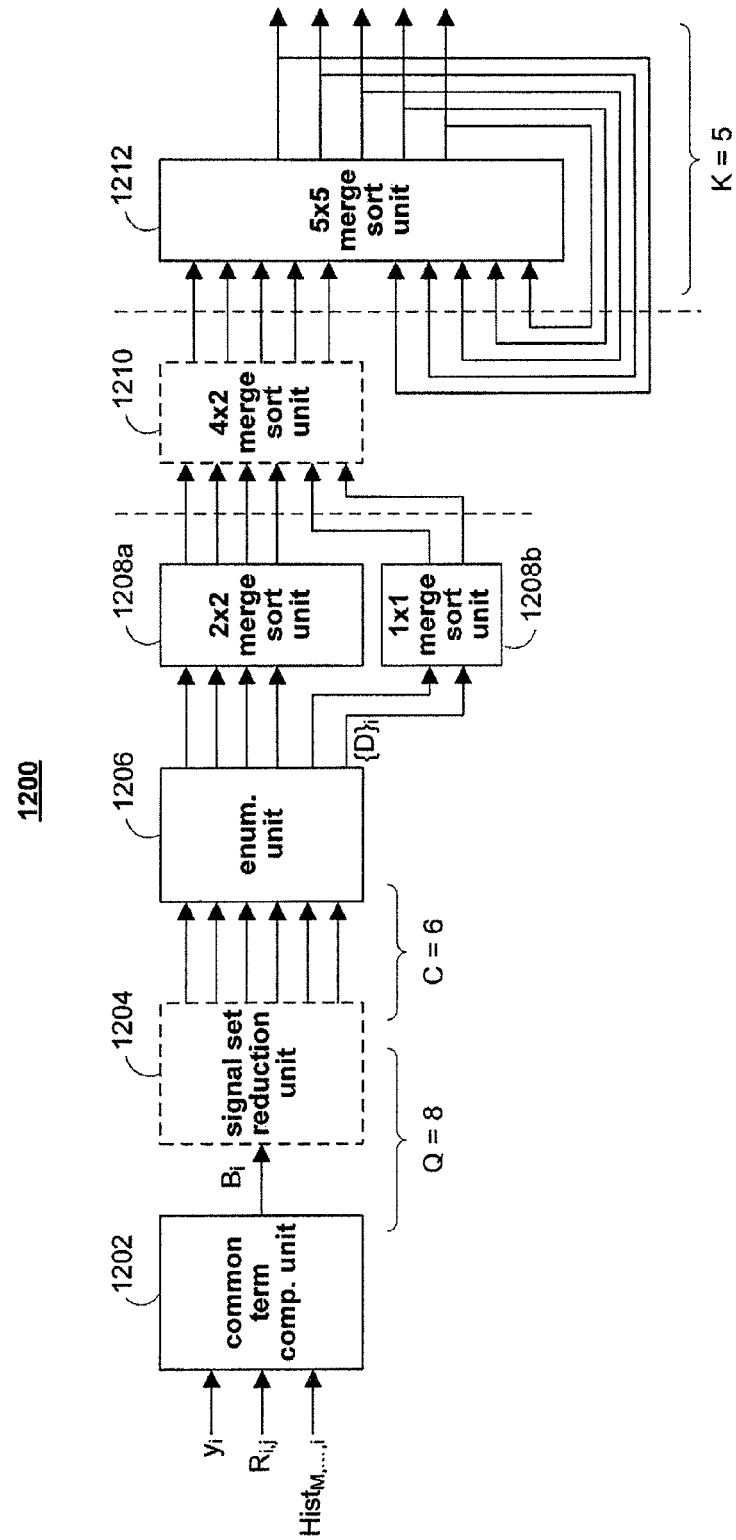
FIG. 12 shows an embodiment of the detector stage of FIG. 10.

Referring now to FIG. 12, illustrative 64-QAM MIMO detector stage 1200 is shown that utilizes several of the above described techniques for implementing a detector stage in accordance with an embodiment of the present invention. Detector stage 1200 can include common term computation unit 1202, signal set reduction unit 1204, enumeration unit 1206, 2×2 merge sort unit 1208a, 1×1 merge sort unit 1208b, 4×2 merge sort unit 1210, and 5×5 merge sort unit 1212. Any of these components may have some or all of the features or functionalities of components with similar names discussed above. As illustrated in FIG. 12, detector stage 1200 is implemented with Q=8 (a dimension of 64-QAM), C=6, and K=5.

Common term computation unit 1202 may provide a processed signal based on a received signal, an upper triangular channel matrix, and information from previous detector stages using any of the techniques described above. That is, using this information, computation unit 1202 may provide a processed signal that can map onto a line graph with the Q=8 signal points of the corresponding signal constellation set. From the processed signal, signal set reduction unit 1204 can select a subset of the Q constellation points. As illustrated in FIG. 12, reduction unit 1204 can select six of the eight signal points to consider in the remainder of the detector stage. Then, enumeration unit 1206 preferably computes distance-based metrics for each of the six symbols selected by signal set reduction unit 1204.

With continuing reference to FIG. 12, the remaining components following enumeration unit 1206 preferably sort the metrics computed by enumeration unit 1206. As indicated by the dotted lines, detector stage 1200 calls for three pipelined stages to complete the merge sort. In the first stage, the six unsorted metrics provided by enumeration unit 1206 can be split and sorted separately. In particular, 2×2 merge sort unit 1208a can sort four of the six metrics, and 1×1 merge sort unit 1208b can sort the other two metrics. The two results can be combined and sorted by the 4×2 merge sort unit 1210 in the next pipelined stage. Because K32 5, 4×2 unit 1210 preferably provides only the five best metrics of the six sorted metrics. These five best metrics preferably correspond to a particular parent node. Thus, in the final pipelined stage, 5×5 merge sort unit 1212 preferably combines and sorts the five best metrics for this parent node with the five best metrics from other parent nodes that have already been processed. From this sort, a new best five metrics may be retained, and can be used again when five more sorted metrics are provided for a next parent node. Because groups of metrics can be sorted within a single pipelined stage, detector stage 1200 can have an throughput improvement of up to five times the throughput of a detector stage that sorts metrics sequentially. This would be a significant throughput improvement and may be highly advantageous for systems that desire high-speed processing.

Figure 13:
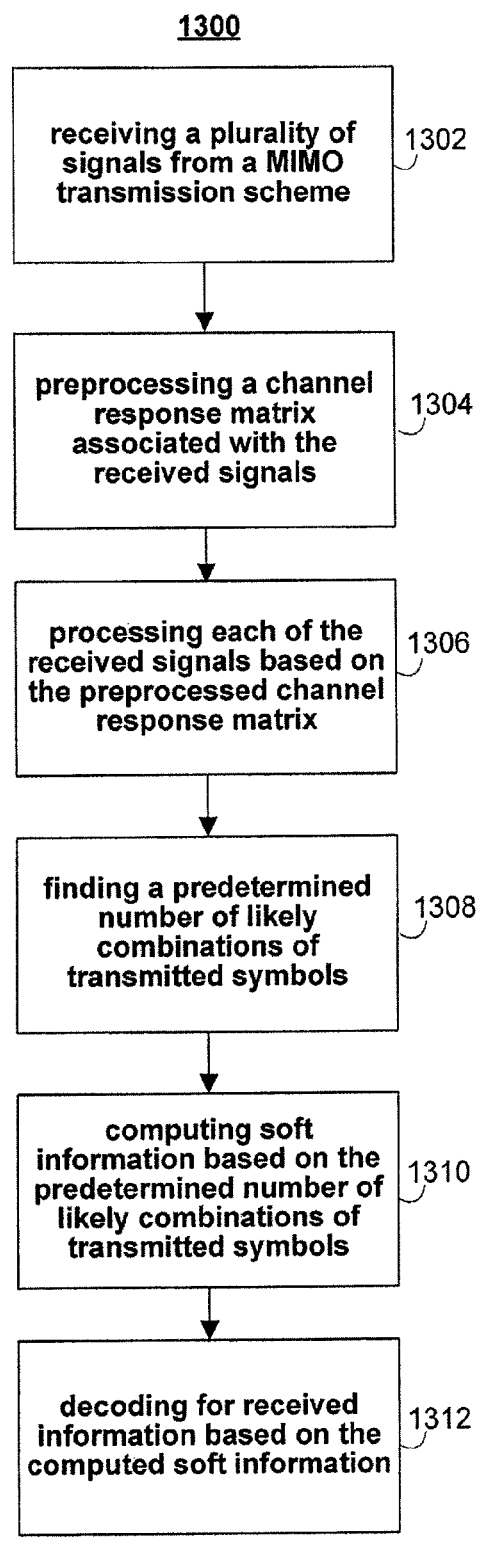
FIG. 13 shows an illustrative flow diagram for decoding received signals from a MIMO system.

Referring now to FIG. 13, illustrative flow diagram 1300 is shown for processing signals received from a MIMO system in accordance with an embodiment of the present invention. At step 1302, a plurality of signals may be received from a MIMO transmission scheme. The plurality of signal may be received from a plurality of receive antennas. The plurality of signals may have been transmitted according to a modulation scheme, such as a PAM, QAM, or PSK transmission scheme. In addition, each of these signals may include information about each of the signals transmitted from the plurality of transmit antennas. That is, each received signal may be a weighted addition of the signals transmitted by the transmit antennas with any additive noise. The way in which the transmit signals are altered prior to reception by the plurality of receive antennas may be represented by a channel response matrix, H.

At step 1304, the channel response matrix associated with the plurality of received signals can be preprocessed. The channel matrix can be preprocessed to form a new, upper triangular matrix, R. This can be accomplished using QR decomposition, Cholesky factorization, or any other suitable triangularization technique. Then, at step 1306, a received signal can be processed based on R, as well as on the K parent nodes obtained from processing another of the received signals. Thus, each of the received signals can be processed in stages. The received signals may be processed such that the ith processed signal may be substantially based on the ith transmit antenna, the processed signal may correspond to a channel response matrix of R.

From the processed received signals, a predetermined number of likely combinations of transmit symbols are determined at step 1308. That is, K likely combinations of symbols are chosen from the many possible combinations of transmitted symbols. These predetermined combinations can be found using a K-best detection algorithm, which implements a breath-first search through a tree diagram (e.g., tree diagram 500 of FIG. 5) representing each combination of possible transmit symbols. Thus, at step 1310, soft information may be computed for each bit transmitted from the plurality of transmit antennas. The soft information may be computed based on the likely combinations of transmit symbols, and based on how likely each of these combinations are. The soft information may be in the form of log-likelihood ratios (LLPs). Finally, if the received information is in a coded form, the soft information can be decoded at step 1312. Thus, the result of decoding preferably corresponds to the information conveyed by a source.

It should be understood that flow diagram 1300 of FIG. 13 is merely illustrative. Any of the steps in flow diagram 1300 may be modified, rearranged, or omitted, and any additional components may be added, without departing from the scope of the present invention.

Figure 14:
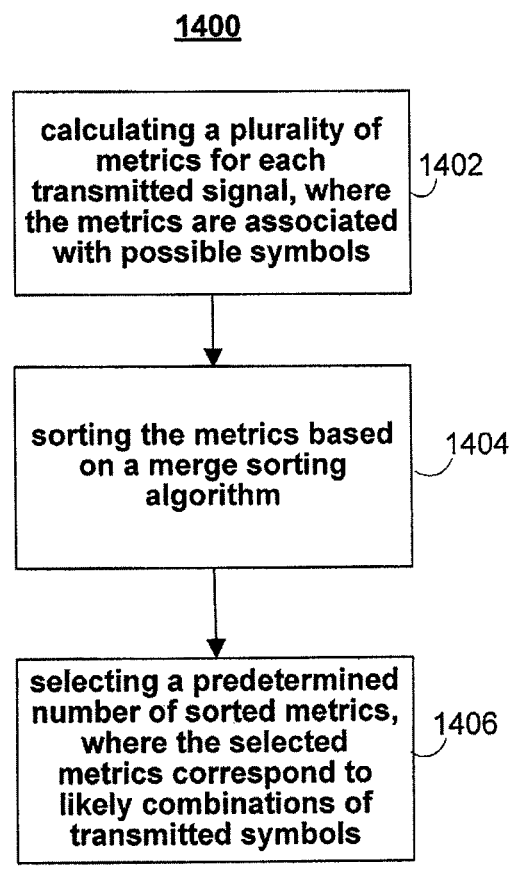
FIG. 14 shows an illustrative flow diagram for finding the K best symbols in a signal constellation set.

Referring now to FIG. 14, illustrative flow diagram 1400 is shown for finding a predetermined number of likely symbols for a symbol period in accordance with an embodiment of the present invention. In some embodiments, the steps of flow diagram 1400 can be incorporated into step 1308 of FIG. 13. At step 1402, a plurality of metrics can be computed for each transmitted signal. Each of the plurality of metrics preferably is associated with a possible symbol in a signal constellation set representing the modulation scheme used. Thus, each metric reflects a likelihood that the transmitted signal actually corresponds to the associated possible symbol. The plurality of metrics preferably are distance-based metrics, and can be based on the distances between a received signal (or processed received signal) and each signal point of the constellation set.

At step 1404, the plurality of metrics computed at step 1402 can be sorted in an order based on the value of the metrics. The metrics can be sorted in an ascending or descending order using a merge sorting algorithm. Thus, as the merge sorting algorithm can sort groups of metrics at a time, the plurality of metrics preferably are sorted within a short amount of time. Then, at step 1406, a predetermined number of metrics can be selected from the sorted metrics, where the selected metrics preferably correspond to combinations of symbols that are likely to have been transmitted during a symbol period. In particular, depending on whether the order is ascending or descending, a predetermined number of best metrics can be obtained by taking the first K metrics or the last K metrics in the sorted sequence.

In some embodiments, the plurality of metrics can be calculated in a plurality of stages, where each stage is associated with a particular received signal. The metrics can be sorted by merge sorting only those metrics within a same stage, and a predetermined number of intermediate metrics can be selected for each stage. Thus, the metrics for a particular stage can be calculated based on the intermediate metrics from a previous stage. The intermediate metrics preferably are associated with intermediate nodes in a tree diagram (e.g., tree diagram 500 of FIG. 5) The predetermined number of selected metrics from a final stage can be used to estimate the digital information. Thus, the final selected metric preferably correspond to a predetermined number of leafs in the tree diagram.

It should be understood that flow diagram 1400 of FIG. 14 is merely illustrative. Any of the steps in flow diagram 1400 may be modified, rearranged, or omitted, and any additional components may be added, without departing from the scope of the present invention.

Figure 15:
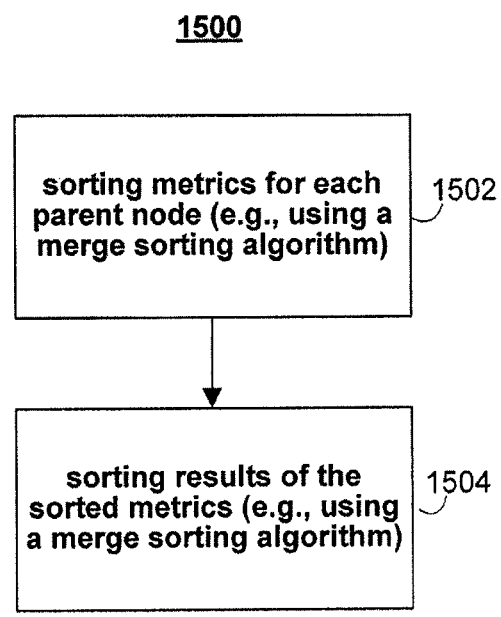
FIG. 15 shows an illustrative flow diagram for sorting metrics.

Referring now to FIG. 15, flow diagram 1500 is shown for sorting a plurality of metrics computed by a detector in accordance with an embodiment of the present invention. In some embodiments, the steps of flow diagram 1500 can be incorporated into step 1404 of flow diagram 1400 (FIG. 14). At step 1502, the plurality of metrics calculated for each parent node may be sorted. The metrics may be sorted using a merge sort. There may be up to Q metrics to sort for a given parent node, as there can be Q constellation points in a corresponding signal constellation set. In other embodiments, there may be up to sqrt(Q) metrics, if each dimension of a complex constellation set is considered separately. In these embodiments, each parent node may have its metrics sorted in two groups: one for the up to sqrt(Q) metrics of the real dimension, and one for the up to sqrt(Q) metrics of the imaginary dimension.

Thus, step 1502 can provide a plurality of groups of metrics, where each group includes sorted metrics associated with a particular parent node. Then, at step 1504, each of these groups of metrics can be combined and sorted into a single group of metrics. The groups of metrics preferably are sorted using a merge sort. In some embodiments, the groups of sorted metrics can be combined and sorted one at a time. In other embodiments, multiple groups of sorted metrics can be sorted at once. Either way, when the metrics within a group are combined and sorted with other metrics of other groups, the sorting may be done in parallel.

It should be understood that flow diagram 1500 of FIG. 15 is merely illustrative. Any of the steps in flow diagram 1500 may be modified or rearranged, and any additional components may be added, without departing from the scope of the present invention.

Figure 16:
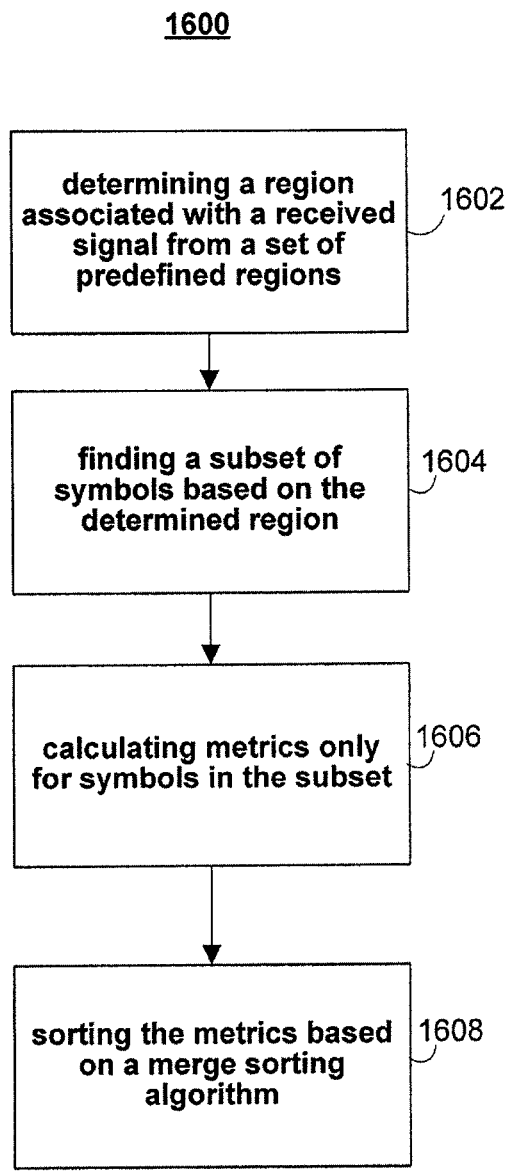
FIG. 16 shows an illustrative flow diagram for reducing the number of signal points considered by a stage of a detector.

Referring now co FIG. 16, illustrative flow diagram 1600 is shown for reducing the number of symbols considered by a detector in accordance with an embodiment of the present invention. In some embodiments, the steps of flow diagram 1600 can be incorporated into step 1308 of flow diagram 1300 (FIG. 13), or can be used in place of steps 1402 and 1404 in flow diagram 1400 (FIG. 14).

At step 1602, a region associated with a received signal is determined from a set of predefined regions. The predefined regions may be similar or the same as those shown in FIGS. 11A and 11B for 16-QAM and 64-QAM signal sets, respectively. A particular region may be selected based on the value of a received signal. In fact, the value of a received signal, or the value of a processed version of the received signal, may fall within the boundaries of a region of the predefined regions, and this region may be selected as the associated region.

With continuing reference to FIG. 16, each predefined region preferably is associated with a subset of symbols. In some embodiments, the subset of symbols may also be predefined, and may be stored in read only memory (ROM). In these embodiments, the subset of symbols may be chosen according to a table lookup into the ROM, and addressing the memory based on the region determined in step 1602. The subset of symbols for each region may be based on the range of signal values within the boundaries of a region. For example, the subset of symbols for a region may include those with signal points within or around the boundaries of the region. Any suitable number of symbols may be selected in step 1604. In some embodiments, only the symbols that are extremely unlikely to correspond to the actual symbol are discarded. In other embodiments, only a few symbols that are either within the boundaries of the region or very close to the boundaries are selected for the subset.

After a subset of symbols is selected from step 1604 of flow diagram 1600, metrics preferably are calculated for each symbol in the subset. That is, rather than computing a metric for each signal point in a signal constellation set, metrics may be calculated for only those selected in step 1604. Once metrics are computed, the metrics may be sorted at step 1608 using any of the techniques described above. In particular, the sorting may be performed using a merge sorting algorithm.

It should be understood that flow diagram 1600 of FIG. 16 is merely illustrative. Any of the steps in flow diagram 1600 may be modified, rearranged, or omitted, and any additional components may be added, without departing from the scope of the present invention.

Referring now to FIGS. 17A-17G, various exemplary implementations of the present invention are shown.

Figure 17A:
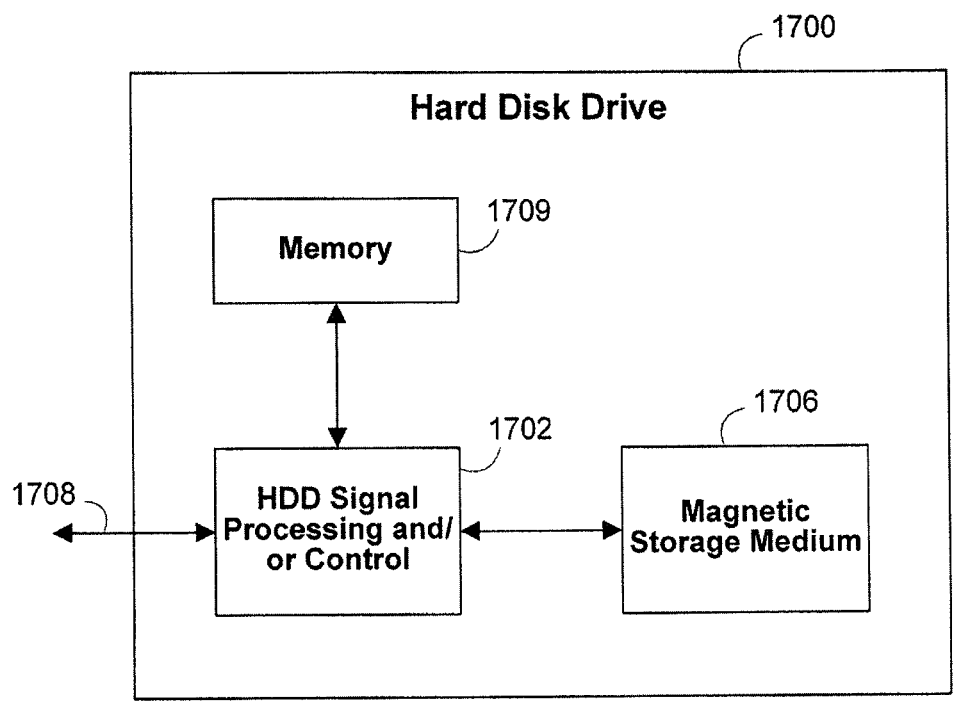
FIG. 17A is a block diagram of an exemplary hard disk drive that can employ the disclosed technology.

Referring now to FIG. 17A, the present invention can be implemented in a hard disk drive 1700. The present invention may implement either or both signal processing and/or control circuits, which are generally identified in FIG. 17A at 1702. In some implementations, the signal processing and/or control circuit 1702 and/or other circuits (not shown) in the HDD 1700 may process data, perform coding and/or encryption, perform calculations, and/or format data that is output to and/or received from a magnetic storage medium 1706.

The HDD 1700 may communicate with a host device (not shown) such as a computer, mobile computing devices such as personal digital assistants, cellular phones, media or MP3 players and the like, and/or other devices via one or more wired or wireless communication links 1708. The HDD 1700 may be connected to memory 1709 such as random access memory (RAM), low latency nonvolatile memory such as flash memory, read only memory (ROM) and/or other suitable electronic data storage.

Figure 17B:
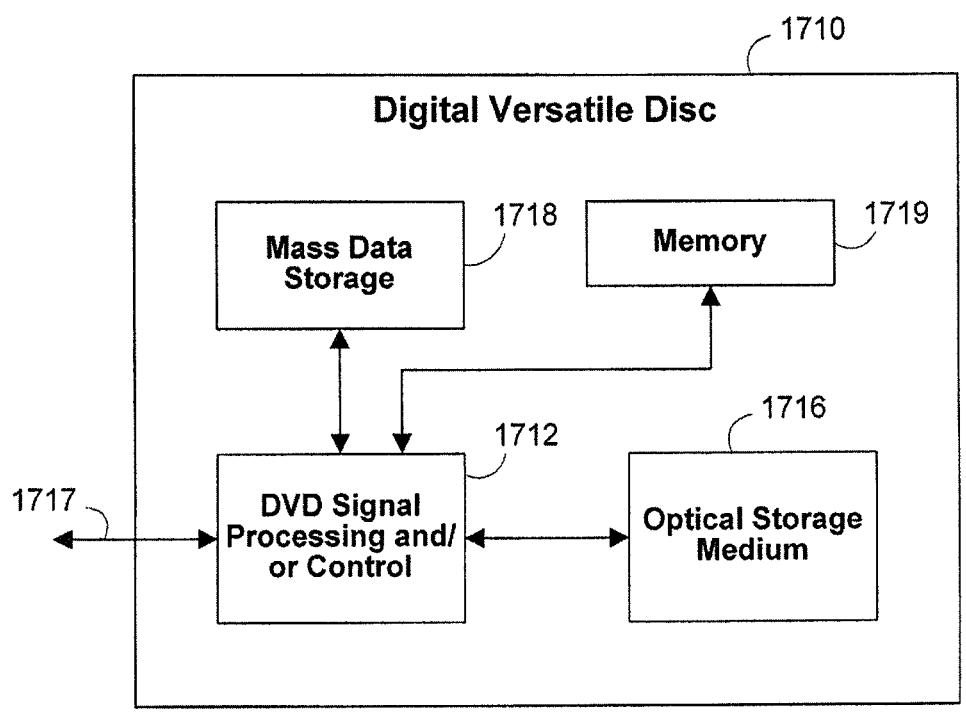
FIG. 17B is a block diagram of an exemplary digital versatile disc that can employ the disclosed technology.

Referring now to FIG. 17B, the present invention can be implemented in a digital versatile disc (DVD) drive 1710. The present invention may implement either or both signal processing and/or control circuits, which are generally identified in FIG. 17B at 1712, and/or mass data storage of the DVD drive 1710. The signal processing and/or control circuit 1712 and/or other circuits (not shown) in the DVD 1710 may process data, perform coding and/or encryption, perform calculations, and/or format data that is read from and/or data written to an optical storage medium 1716. In some implementations, the signal processing and/or control circuit 1712 and/or other circuits (not shown) in the DVD 1710 can also perform other functions such as encoding and/or decoding and/or any other signal processing functions associated with a DVD drive.

The DVD drive 1710 may communicate with an output device (not shown) such as a computer, television or other device via one or more wired or wireless communication links 1717. The DVD 1710 may communicate with mass data storage 1718 that stores data in a nonvolatile manner. The mass data storage 1718 may include a hard disk drive (HDD). The HDD may have the configuration shown in FIG. 17A. The HDD may be a mini HDD that includes one or more platters having a diameter that is smaller than approximately 1.8". The DVD 1710 may be connected to memory 1719 such as RAM, ROM, low latency nonvolatile memory such as flash memory and/or other suitable electronic data storage.

Figure 17C:
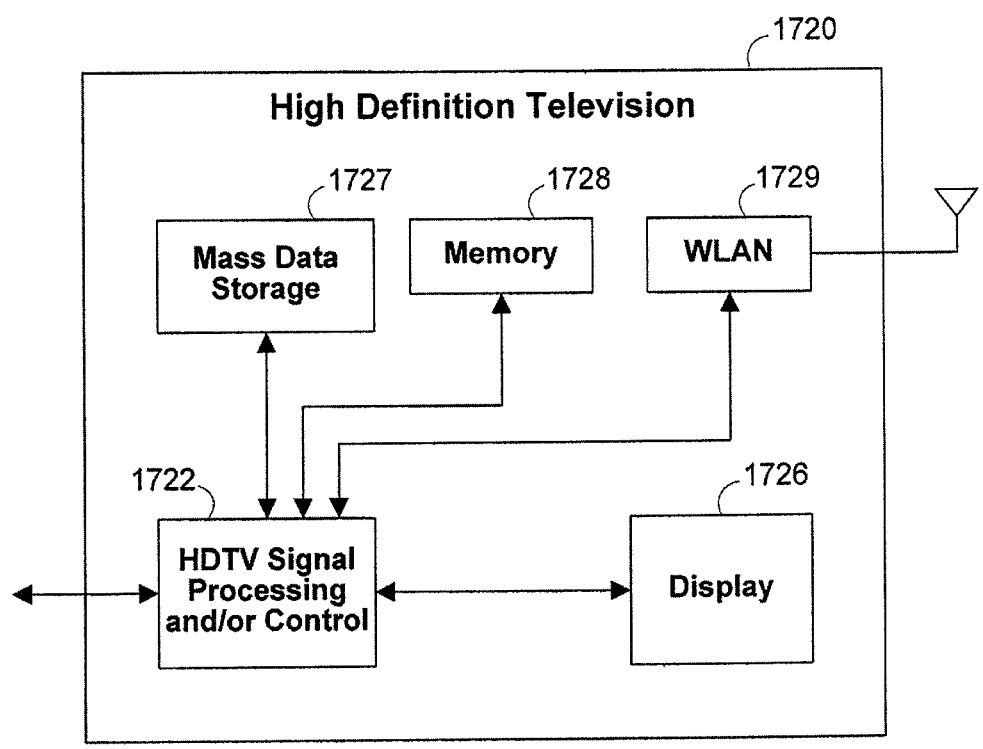
FIG. 17C is a block diagram of an exemplary high definition television that can employ the disclosed technology.

Referring now to FIG. 17C, the present invention can be implemented in a high definition television (HDTV) 1720. The present invention may implement either or both signal processing and/or control circuits, which are generally identified in FIG. 17C at 1722, a WLAN interface and/or mass data storage of the HDTV 1720. The HDTV 1720 receives HDTV input signals in either a wired or wireless format and generates HDTV output signals for a display 1726. In some implementations, signal processing circuit and/or control circuit 1722 and/or other circuits (not shown) of the HDTV 1720 may process data, perform coding and/or encryption, perform calculations, format data and/or perform any other type of HDTV processing that may be required.

The HDTV 1720 may communicate with mass data storage 1727 that stores data in a nonvolatile manner such as optical and/or magnetic storage devices for example hard disk, drives HDD and/or DVDs. At least one HDD may have the configuration shown in FIG. 17A and/or at least one DVD may have the configuration shown in FIG. 17B. The HDD may be a mini HDD that includes one or more platters having a diameter that is smaller than approximately 1.8". The HDTV 1720 may be connected to memory 1728 such as RAM, ROM, low latency nonvolatile memory such as flash memory and/or other suitable electronic data storage. The HDTV 1720 also may support connections with a WLAN via a WLAN network interface 1729.

Figure 17D:
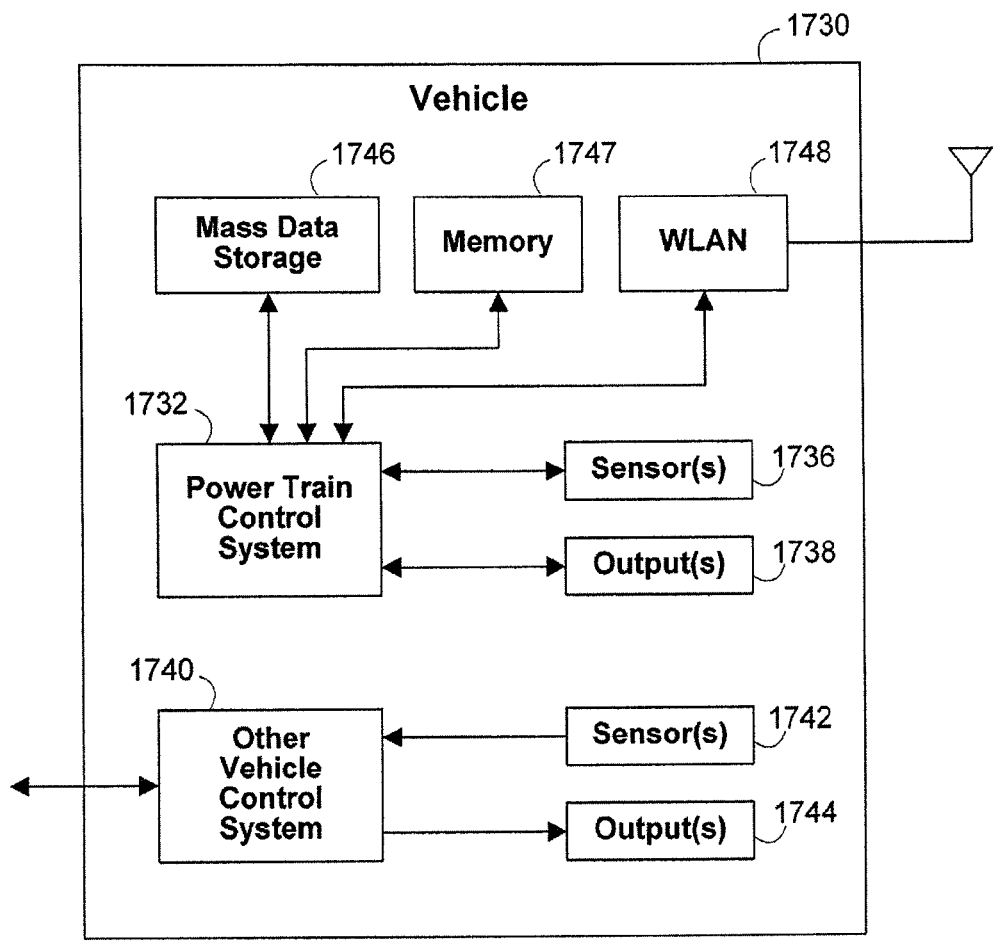
FIG. 17D is a block diagram of an exemplary vehicle that can employ the disclosed technology.

Referring now to FIG. 17D, the present invention implements a control system of a vehicle 1730, a WLAN interface and/or mass data storage of the vehicle control system. In some implementations, the present invention may implement a powertrain control system 1732 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1740 of the vehicle 1730. The control system 1740 may likewise receive signals from input sensors 1742 and/or output control signals to one or more output devices 1744. In some implementations, the control system 1740 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still ether implementations are contemplated.

The powertrain control system 1732 may communicate with mass data storage 1746 that stores data in a nonvolatile manner. The mass data storage 1046 may include optical and/or magnetic storage devices for example hard disk drives HDD and/or DVDs. At least one HDD may have the configuration shown in FIG. 17A and/or at least one DVD may have the configuration shown in FIG. 17B. The HDD may be a mini HDD that includes one or more platters having a diameter that is smaller than approximately 1.8".The powertrain control system 1732 may be connected to memory 1747 such as RAM, ROM, low latency nonvolatile memory such as flash memory and/or other suitable electronic data storage. The powertrain control system 1732 also may support connections with a WLAN via a WLAN network interface 1748. The control system 1740 may also include mass data storage, memory and/or a WLAN interface (all not shown).

Figure 17E:
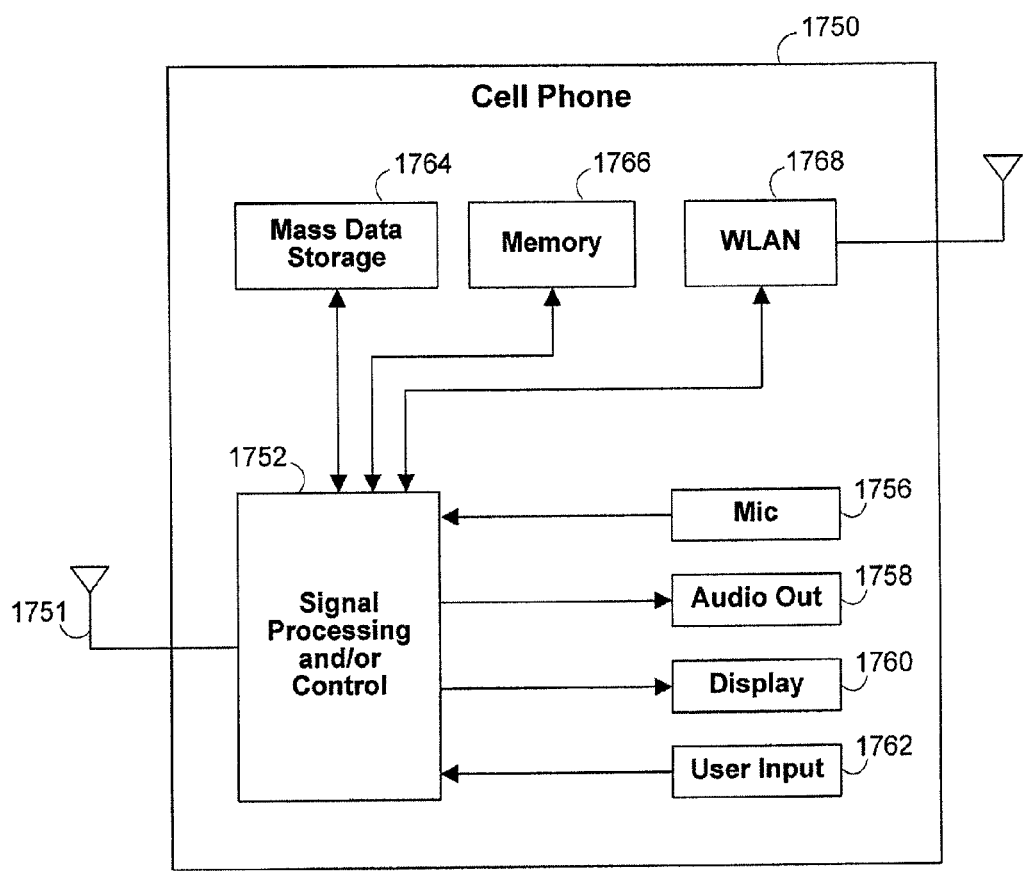
FIG. 17E is a block diagram of an exemplary cell phone that can employ the disclosed technology.

Referring now to FIG. 17E, the present invention can be implemented in a cellular phone 1750 that may include a cellular antenna 1751. The present invention may implement either or both signal processing and/or control circuits, which are generally identified in FIG. 17E at 1752, a WLAN interface and/or mass data storage of the cellular phone 1750. In some implementations, the cellular phone 1750 includes a microphone 1756, an audio output 1758 such as a speaker and/or audio output jack, a display 1760 and/or an input device 1762 such as a keypad, pointing device, voice actuation and/or other input device. The signal processing and/or control circuits 1752 and/or other circuits (not shown) in the cellular phone 1750 may process data, perform coding and/or encryption, perform calculations, format data and/or perform other cellular phone functions.

The cellular phone 1750 may communicate with mass data storage 1764 that stores data in a nonvolatile manner such as optical and/or magnetic storage devices for example hard disk drives HDD and/or DVDs. At least one HDD may have the configuration shown in FIG. 17A and/or at least one DVD may have the configuration shown in FIG. 17B. The HDD may be a mini HDD that includes one or more platters having a diameter that is smaller than approximately 1.8". The cellular phone 1750 may be connected to memory 1766 such as RAM, ROM, low latency nonvolatile memory such as flash memory and/or other suitable electronic data storage. The cellular phone 1750 also may support connections with a WLAN via a WLAN network interface 1768.

Figure 17F:
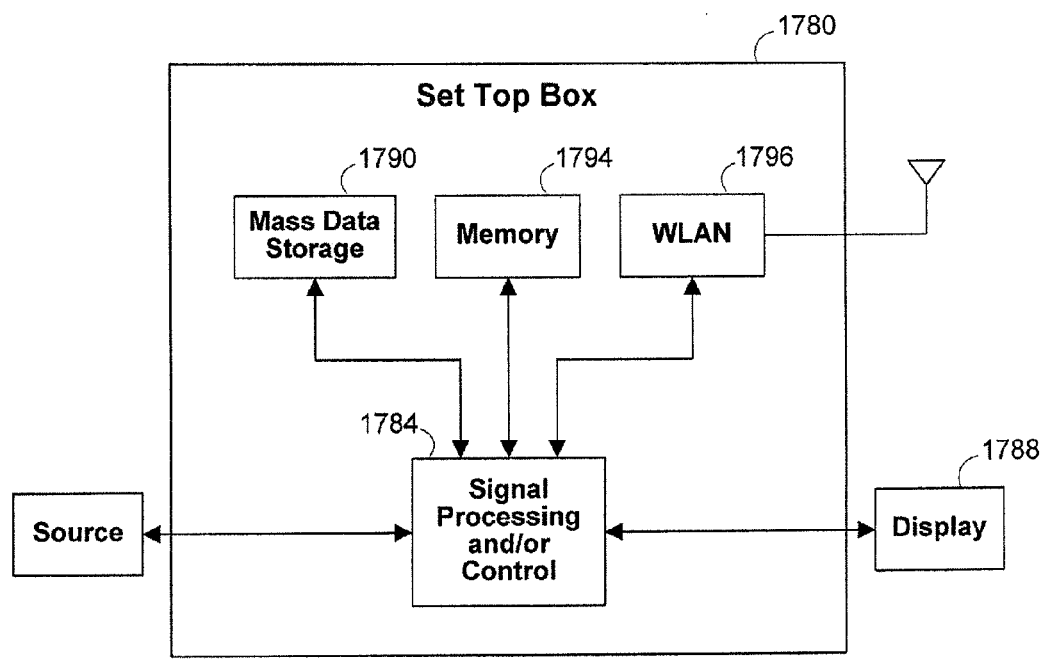
FIG. 17F is a block diagram of an exemplary set top box that can employ the disclosed technology.

Referring now to FIG. 17F, the present invention can be implemented in a set top box 1780. The present invention may implement either or both signal processing and/or control circuits, which are generally identified in FIG. 17F at 1784, a WLAN interface and/or mass data storage of the set top box 1780. The set top box 1780 receives signals from a source such as a broadband source and outputs standard and/or high definition audio/video signals suitable for a display 1788 such as a television and/or monitor and/or other video and/or audio output devices. The signal processing and/or control circuits 1784 and/or other circuits (not shown) of the set top box 1780 may process data, perform coding and/or encryption, perform calculations, format data and/or perform any other set top box function.

The set top box 1780 may communicate with mass data storage 1790 that stores data in a nonvolatile manner. The mass data storage 1790 may include optical and/or magnetic storage devices for example hard disk drives HDD and/or DVDs. At least one HDD may have the configuration shown in FIG. 17A and/or at least one DVD may have the configuration shown in FIG. 17B. The HDD may be a mini HDD that includes one or more platters having a diameter that is smaller than approximately 1.8". The set top box 1780 may be connected to memory 1794 such as RAM, ROM, low latency nonvolatile memory such as flash memory and/or other suitable electronic data storage. The set top box 1780 also may support connections with a WLAN via a WLAN network interface 1796.

Figure 17G:
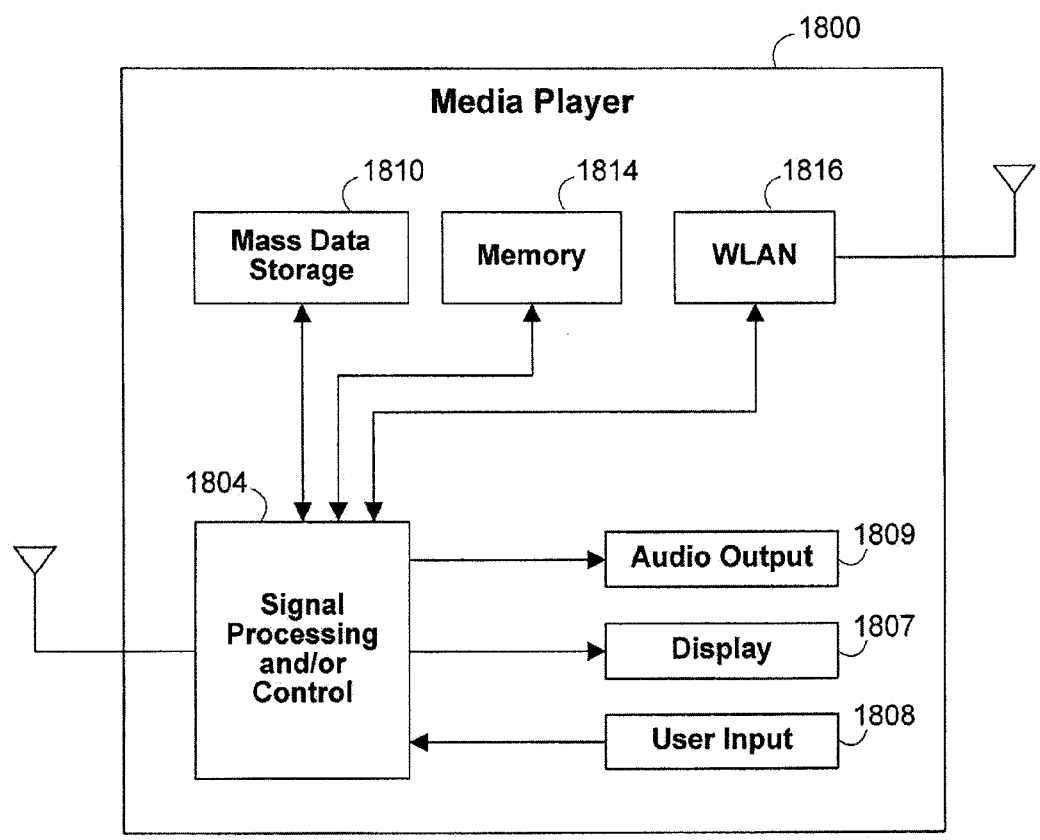
FIG. 17G is a block diagram of an exemplary media player that can employ the disclosed technology.

Referring now to FIG. 17G, the present invention can be implemented in a media player 1860. The present invention may implement either or both signal processing and/or control circuits, which are generally identified in FIG. 17G at 1804, a WLAN interface and/or mass data storage of the media player 1800. In some implementations, the media player 1800 includes a display 1807 and/or a user input 1808 such as a keypad, touchpad and the like. In some implementations, the media player 1800 may employ a graphical user interface (GUI) that typically employs menus, drop down menus, icons and/or a point-and-click interface via the display 1807 and/or user input 1808. The media player 1800 further includes an audio output 1809 such as a speaker and/or audio output jack. The signal processing and/or control circuits 1804 and/or other circuits (not shown) of the media player 1800 may process data, perform coding and/or encryption perform calculations, format data and/or perform any other media player function.

The media player 1800 may communicate with mass data storage 1810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 17A and/or at least one DVD may have the configuration shown in FIG. 17B. The HDD may be a mini HDD that includes one or more platters having a diameter that is smaller than approximately 1.8". The media player 1800 may be connected to memory 1814 such as RAM, ROM, low latency nonvolatile memory such as flash memory and/or other suitable electronic data storage. The media player 1800 also may support connections with a WLAN via a WLAN network interface 1816. Still other implementations in addition to those described above are contemplated.

The foregoing describes systems and methods for finding the nearest neighbors of a received signal for calculating soft information in a multi-level modulation scheme. Those skilled in the art will appreciate that the invention can be practiced by other than the described embodiments, which are presented for the purpose of illustration rather than of limitation.

What is claimed is:

1. A method of finding likely combinations of transmitted symbols from a plurality of received signals for use in reconstructing streams of transmitted information in a multiple-input multiple-output transmission system, the method comprising:
    identifying a set of likely symbols for each of a plurality of transmitters output sequentially, wherein identifying a set of likely symbols for one of the transmitter outputs comprises:
        computing multiple sets of metrics, wherein each set is computed based on previously identified likely symbols associated with other transmitter outputs;
        sorting the metrics in each set; and
        sorting results of the sorted metrics.

2. The method of claim 1 wherein sorting the metrics in each set comprises merge sorting the metrics.

3. The method of claim 1 wherein sorting the results comprises merge sorting the results.

4. The method of claim 1 wherein each metric indicates a likelihood of a corresponding symbol having actually been transmitted from a transmitter output.

5. The method of claim 1 wherein identifying the set of likely symbols for the transmitter output further comprises selecting metrics with smallest value from the sorted results.

6. The method of claim 1 wherein sorting results comprises sorting each of the sorted metrics sequentially.

7. The method of claim 1 wherein identifying a set of likely symbols comprises:
    modeling possible combinations of transmitted symbols in a tree diagram; and
    searching the tree diagram using a K-Best detection algorithm.

8. The method of claim 1 wherein the previously identified likely symbols correspond to a node of the tree diagram.

9. The method of claim 1 further comprising calculating an estimate of the transmitted information based on a predetermined number of the sorted metrics.

10. A receiver for finding likely combinations of transmitted symbols from a plurality of received signals in a multiple-input multiple-output transmission system, the receiver comprising:
    a detector configured to identify a set of likely symbols for each of a plurality of transmitter outputs in a plurality of stages, wherein at least one of the stages comprises:
        an enumeration unit configured to compute multiple sets of metrics, wherein each set is computed based on previously identified likely symbols associated with other transmitter outputs;
        a first sorting unit configured to sort the metrics in each set; and
        a second sorting unit configured to sort results of the sorted metrics.

11. The receiver of claim 10 wherein the first sorting unit merge sorts the metrics in each set.

12. The receiver of claim 10 wherein the second sorting unit merge sorts the results of the sorted metrics.

13. The receiver of claim 10 wherein each metric indicates a likelihood of a corresponding symbol being an actually transmitted symbol.

14. The receiver of claim 10 wherein the stages of the detector are further configured to select metrics with smallest value from the sorted results.

15. The receiver of claim 10 wherein the second merge sort unit sorts each of the sorted metrics sequentially.

16. The receiver of claim 10 wherein the detector is configured to:
- model possible combinations of transmitted symbols in a tree diagram; and
- search the tree diagram using a K-Best detection algorithm.

17. The receiver of claim 16 wherein the previously identified likely symbols correspond to a node of the tree diagram.

18. The receiver of claim 10 wherein the first sorting unit comprises a plurality of pipelined sorting stages.

19. The receiver of claim 10 wherein the detector is further configured to calculate an estimate of transmitted information corresponding to the transmitted symbols based on a predetermined number of the sorted metrics.

* * * * *